United States Patent [19]

Vlahos

[11] Patent Number: 5,032,901
[45] Date of Patent: Jul. 16, 1991

[54] BACKING COLOR AND LUMINANCE NONUNIFORMITY COMPENSATION FOR LINEAR IMAGE COMPOSITING

[76] Inventor: Petro Vlahos, 14748 Flintstone Dr., Lake Hughes, Calif. 93532

[21] Appl. No.: 212,562

[22] Filed: Jun. 28, 1988

[51] Int. Cl.$^5$ .............................................. H04N 9/64
[52] U.S. Cl. .................................................. 358/22
[58] Field of Search ........................................ 358/22

[56] References Cited

U.S. PATENT DOCUMENTS 4,589,013  5/1986  Vlahas et al. .................... 358/22

FOREIGN PATENT DOCUMENTS 0150385  9/1983  Japan .................................. 358/22

Primary Examiner—Howard W. Britton
Assistant Examiner—David E. Harvey
Attorney, Agent, or Firm—Blakely, Sokoloff, Taylor & Zafman

[57] ABSTRACT

A linear image compositing system which corrects for nonuniform luminance and/or color of the colored backing without incurring the penalties of edge glow, edge darkening, loss of edge detail and other anomalies. A control signal is created directly proportional to the luminance of the colored backing and controls the level of the BG scene. Unless the control signal is corrected, the background scene will contain all the brightness and color variations occurring on the colored backing. Correction factors are developed by comparing the RGB video obtained from the backing before the subject is put in place, with the ideal values of RGB that would have been obtianed from a perfect backing. These correction factors correct the RGB video when the scene is scanned with the subject in place. The control signal, being zero in the subject area, may be used to inhibit the corrections in the subject area.

8 Claims, 12 Drawing Sheets

FIG. 3
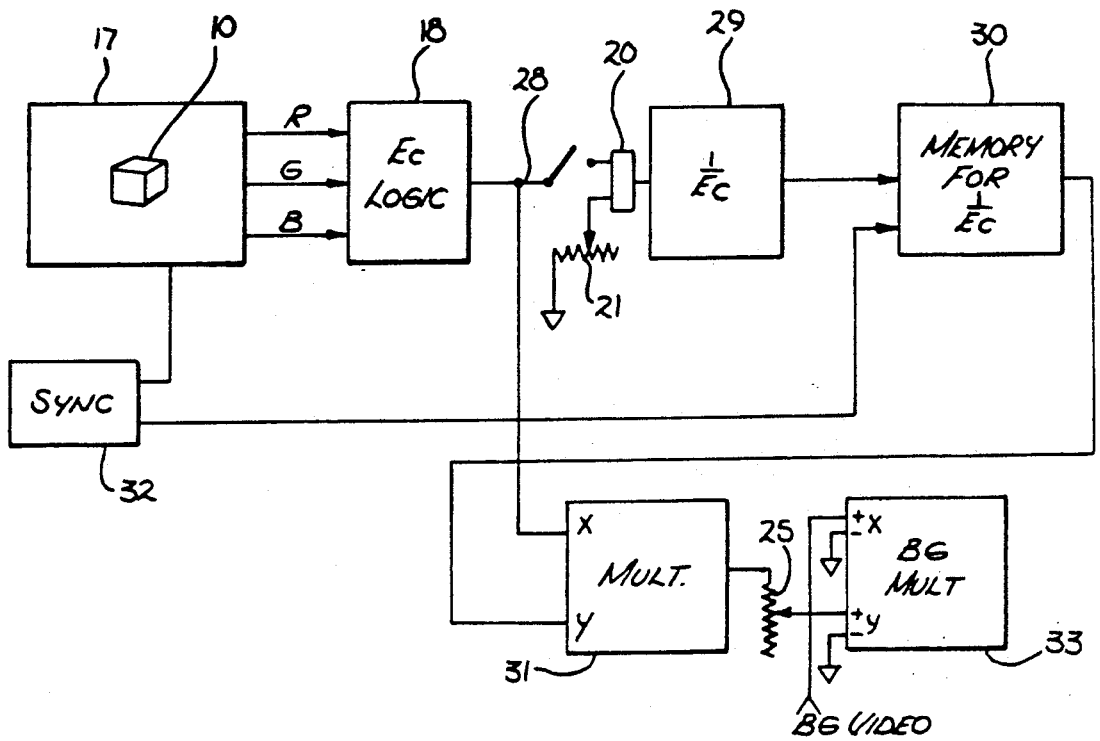
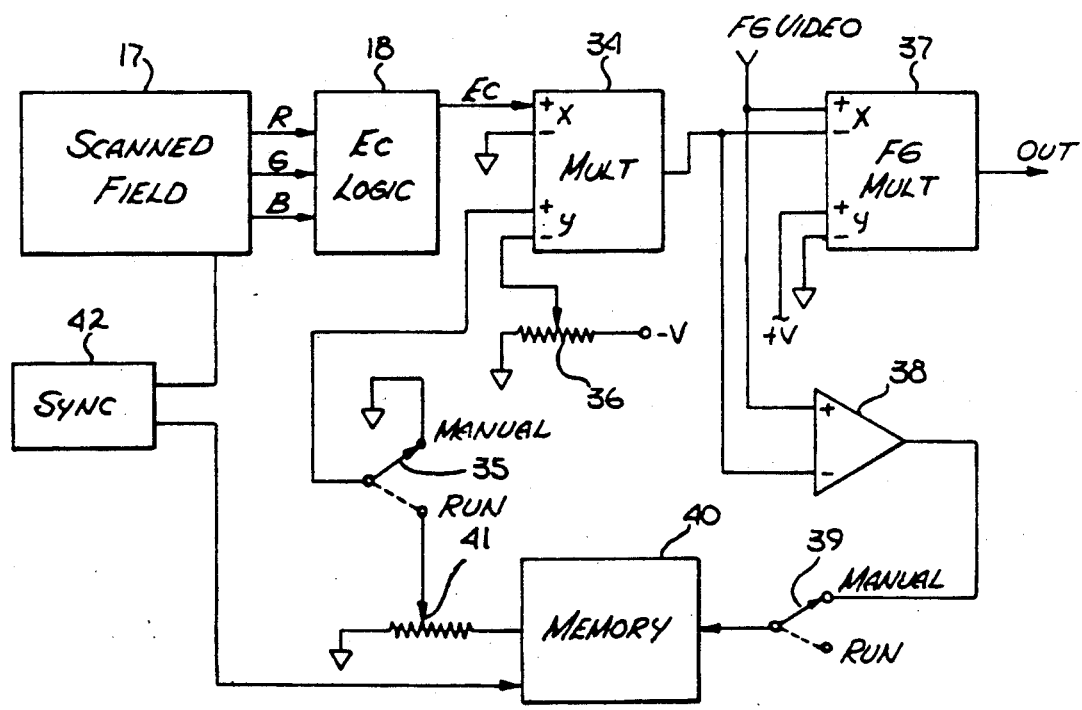
FIG. 6

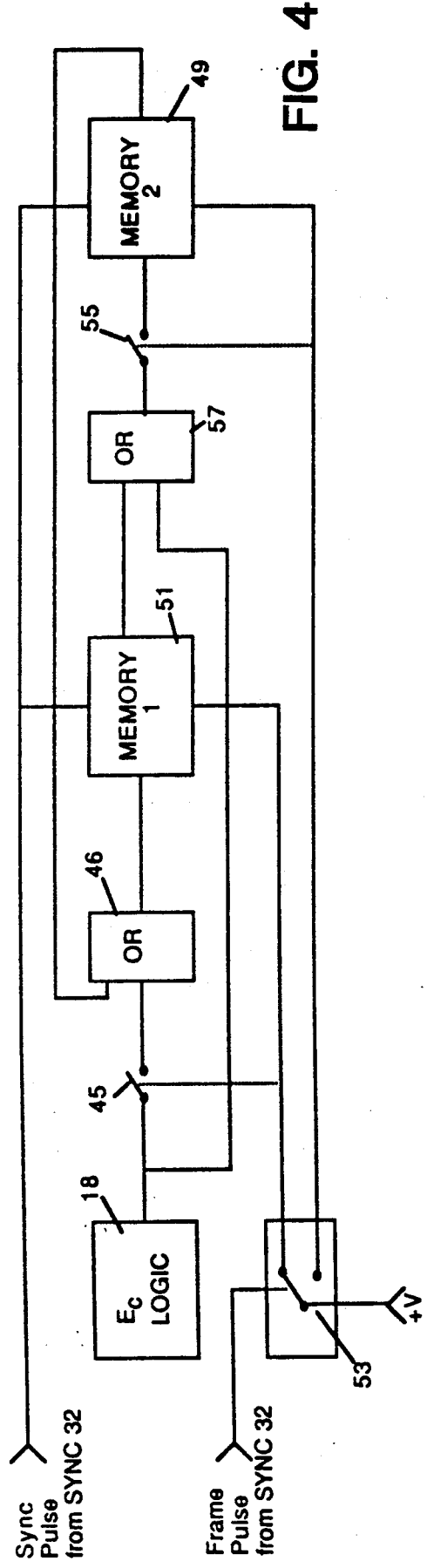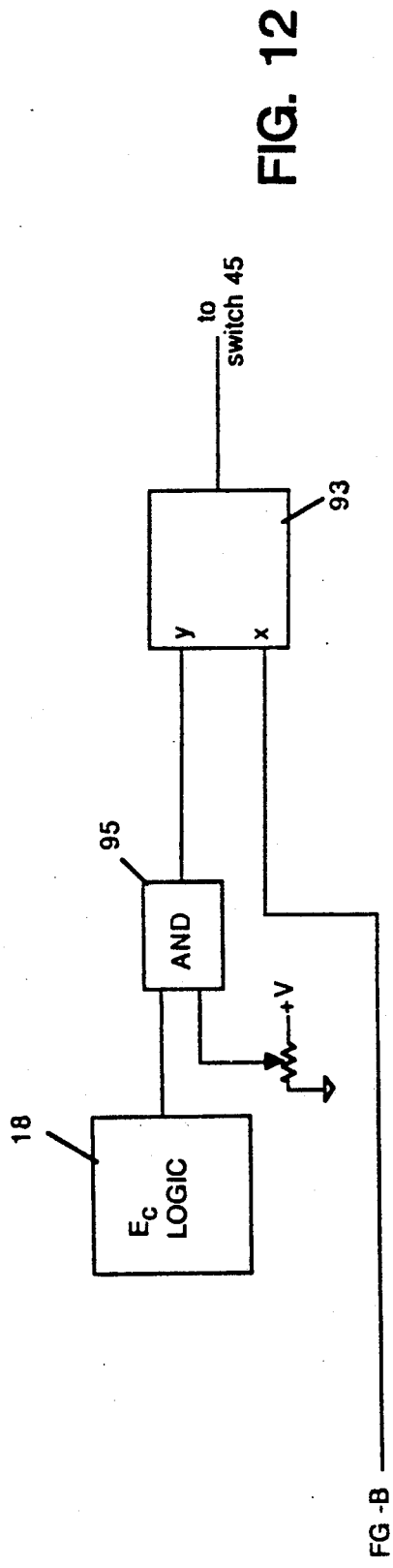

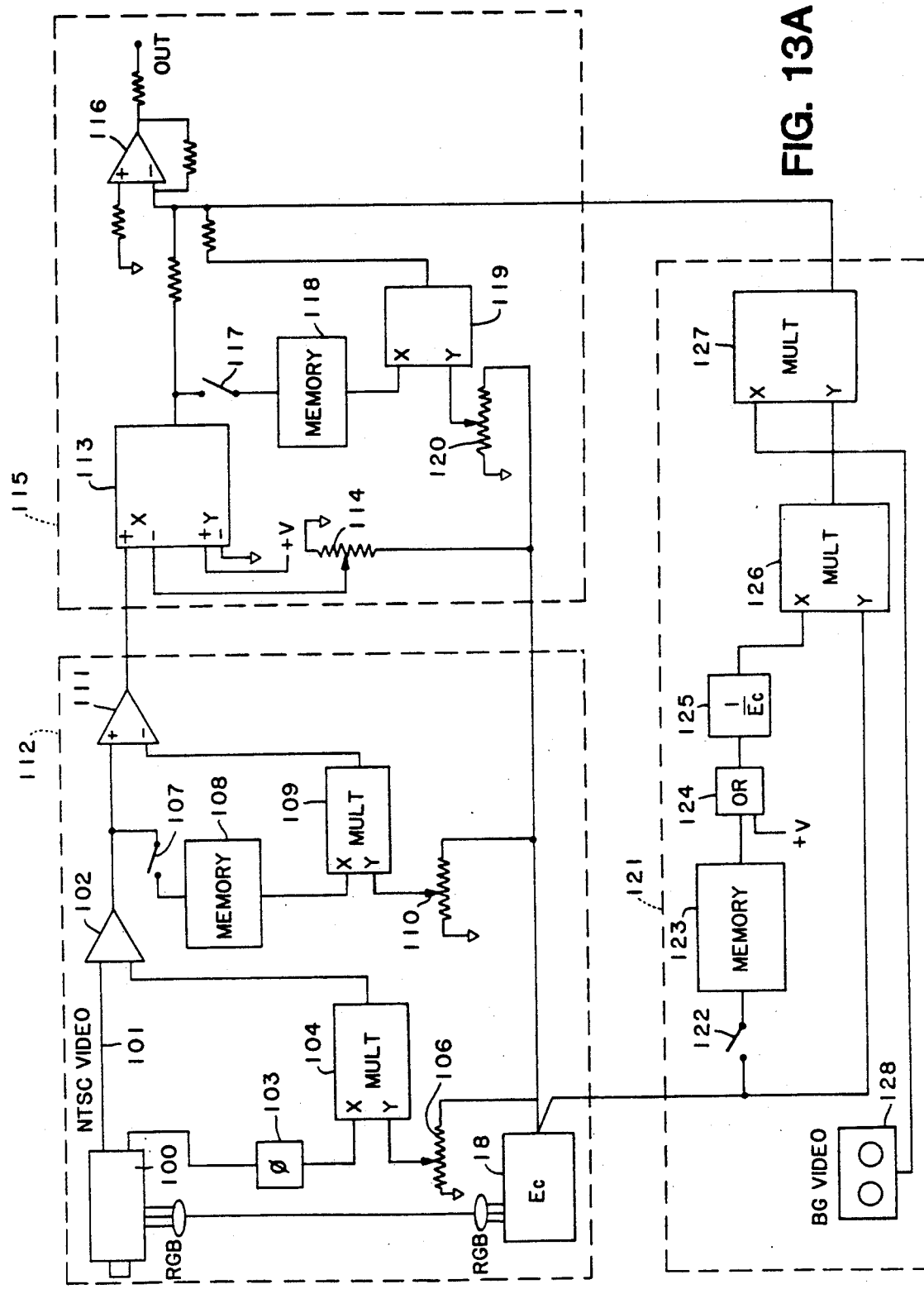

BACKING COLOR AND LUMINANCE NONUNIFORMITY COMPENSATION FOR LINEAR IMAGE COMPOSITING

BACKGROUND

Electronic image compositing is employed by the video industry for superimposing (compositing) a foreground (FG) subject over a background (BG) scene. The FG subject is typically a person or an object placed before an illuminated colored backing. The compositing apparatus replaces the colored backing with the BG scene. This process is used extensively in producing TV shows and commercials.

For nearly 30 years a switching process known as chroma key has been used for compositing video images. Switching occurs between the BG scene and the FG subject as a function of the presence or absence of the chroma of the backing.

A switching compositing system which switches as a function of the presence or absence of the chroma of the backing represents an "OR" logic; that is, one sees either the FG scene "OR" the BG scene but not both. When a subject is semitransparent, such as thin smoke, liquids and glassware, one should see the subject, and one should also see the background scene through the subject. For semitransparent subjects, there is no appropriate place to switch. A switching compositing system is incapable of reproducing semitransparent subjects. More recently the applicant has introduced to the video industry a linear, non-switching, image compositing method utilizing an "AND" concept Apparatus which utilize this process are sold under the trademark Ultimatte. In this method a linear control signal ($E_c$) is formed as a function of the brightness and visibility of the colored backing. Any color may be used for the backing, but blue has been most popular, and therefore the colored backing is often referred to as the Blue Backing. The backing will therefore be referred to as a blue backing in the description of this invention.

The linear control signal $E_c$ is normally used to reduce the chroma and luminance of the backing to a low level such as neutral grey or to zero video (black). $E_c$ also linearly controls the level of the BG scene video. The BG scene is thus visible through the FG subject to the extent the subject was transparent. Since the colored backing may be reduced to black, the BG scene may be added to the FG subject by simple addition. The linear compositing method is described by the applicant's following U.S. Pat. Nos. 3,595,987; 4,007,487; 4,100,569; 4,344,085; 4,409,611; 4,589,013; 4,625,231. The linear (non-switching) compositing method produces superb and undetectable composite images. Smoke, liquids, glassware and fine detail, such as individual strands of hair, are composited as if the scene were real. Shadows are retained and become shadows on the BG scene. Unfortunately, the linear compositing method also reproduces every wrinkle in the backing, its texture, its seams, smudges, rub marks and unintentional shadows.

On large colored backings it is not a simple matter to achieve uniform illumination. Large backings require multiple light source whose patterns imperfectly overlap. The light sources must be kept out of the camera field thus placing them in positions not conducive for achieving illumination uniformity. Limitations of available electric power, or an insufficient number of lighting units, typically results in lower levels of illumination to be compensated for by opening the camera lens aperture a stop or two. Even if the backing illumination were uniform, a large aperture setting on the camera lens induces some lens vignetting (corner fall off).

For a variety of reasons the colored backing is not likely to provide a uniform video signal level over the entire field. Since Ec is derived from this colored field and controls the level of the BG scene, unless $E_c$ is corrected, the background scene will contain all of the brightness variations occurring on the colored backing and induced by lens vignetting.

A clean, smooth, seamless backing having uniform luminance is sometimes achieved, but this ideal is not always practical, nor economically feasible. In applicant's later patents, methods and apparatus are disclosed for correcting backing defects, nonuniform illumination, and undesired shadows by electronic means. For example, an adjustable $E_c$ clip level causes the backing to appear to be uniformly illuminated. A second circuit called "cleanup" helps to remove backing seams as well as dusty footprints tracked onto a clean blue floor. When used for small corrections, the $E_c$ clip and cleanup do not produce an observable penalty.

The penalty for using substantial amounts of $E_c$ clipping is that the subject appears to be backlighted. This backlighting effect causes a slight glow to loose hair and to subject edges. While a backlight effect may sometimes be desirable, in other scenes it is not acceptable.

The penalty for using excessive cleanup is the loss of fine edge detail, such as individual strands of hair. The loss of edge detail is quite essential in eliminating the fine wires used to "Fly" objects or persons. However, when cleanup is used to eliminate footprints or backing defects, loss of hair detail becomes an unwelcome tradeoff.

The preceding discussion dealt with luminance nonuniformity of the backing. A second type of nonuniformity is color. One part of the backing will appear to have a slightly different shade of blue, for example. Although one may use the identical material in coloring a wall and floor, the wall will always have a higher color saturation than the floor. Visually, and to the camera, a wall appears to be a bright blue, while a floor appears to be a bluetinted grey. The camera faces the wall surface at essentially right angles, but the floor is seen at a small low angle. Diffuse surfaces provide low angle scattering of white light and thus the floor appears to be a somewhat desaturated blue.

When one subtracts a sufficient level of the $E_c$ control signal from FG video to cause the blue wall to go black, the floor remains a dull grey. Additional subtraction of the control signal to reduce the floor to black will cause the wall to approach black too soo causing a darkened edge to FG subjects in the wall area.

Applicant's U.S. Pat. No. 4,625,231 compensates for the wall/floor color difference by using an automatic bias circuit. This circuit continuously monitors the video in the blue backing area and adjusts the $E_c$ control signal level on a line-by-line basis to result in video just reaching zero in both the wall and floor areas.

This method of correcting for color variation works well for wall and floor color differences, but it does not adequately correct for color differences that occur for blue set pieces. A styrofoam rock, a flat, a stairway or other shape is painted blue and placed on the stage to match the size, shape and apparent position of similar objects in the BG scene. Such blue set pieces add realism to the composite scene, since the actor's shadow is distorted by the rock or staircase, as it would have been had he been in the actual BG scene. Set pieces also permit the actor to appear to walk behind objects that are actually in the BG scene.

These blue set pieces may be placed at various angles and positions with respect to the camera and set lighting lamps. The result is a slight color difference. An autobias circuit cannot adequately correct for color and brightness differences on individual set pieces.

SUMMARY OF INVENTION

It is the purpose and function of this invention to electronically eliminate the nonuniformity of luminance and nonuniformity of color of the blue backing and of blue set pieces employed in image compositing, without incurring the penalties of edge glow, edge darkening, loss of edge detail and other anomalies.

Within a given scene, there are no criteria in the FG video signal by which one may electronically differentiate between floor glare which is not wanted, and a thin layer of white fog which is wanted; between color differences in the backing, which are not wanted and color differences in the FG scene which are wanted; and between a shadow cast by a blue set piece which is not wanted, and a shadow cast by the actor which is wanted.

Criteria exist when the FG video signal is examined with subject removed and compared with the FG video signal obtained with subject in place.

In the absence of the subject, the RGB video levels (or their differences) are compared to a fixed constant (e.g., 1.0) and any such difference is then employed to generate a correction factor that raises or lowers the video level in the blue backing area to achieve a video level representing a constant luminance and a constant color. Such corrections are stored in memory and are used to modify the FG RGB video signal when the FG subjects are in place. Corrections that correct for nonuniform luminance and color of the backing may be applied only in the backing area not obstructed by the subject, or may be applied to the entire scene including the subject.

While the correction of backing luminance and color nonuniformity are a primary benefit to a linear compositing system, the switching type compositing systems may also benefit as a result of improved switching criteria provided by a uniform backing. The present invention may also be utilized with cameras which provide a fourth channel generally known as luminance (59% Green, 30% Red, 11% Blue) in addition to the three RBG channels. The only change necessary to practice the invention with such cameras is the addition of circuitry identical to that which is used for each of the RBG channels.

BRIEF DESCRIPTION OF THE DRAWINGS

FIG. 3 is a block diagram of a circuit for implementing backing luminance correction according to the present invention.

FIG. 4 is a block diagram of a circuit for loading a memory used to correct backing color non-uniformities with the foreground subject present.

FIG. 6 is a block diagram of a circuit for implementing backing color correction for a single color according to the present invention.

FIG. 12 is a block diagram of a clip circuit for setting a threshold below which RGB video representing the subject is inhibited.

FIG. 13a is a block diagram of a circuit for implementing backing non-uniformity color and luminance corrections when the video is in the form of an NTSC or PAL color encoded signal.

DETAILED DESCRIPTION OF THE INVENTION

Figure 1:
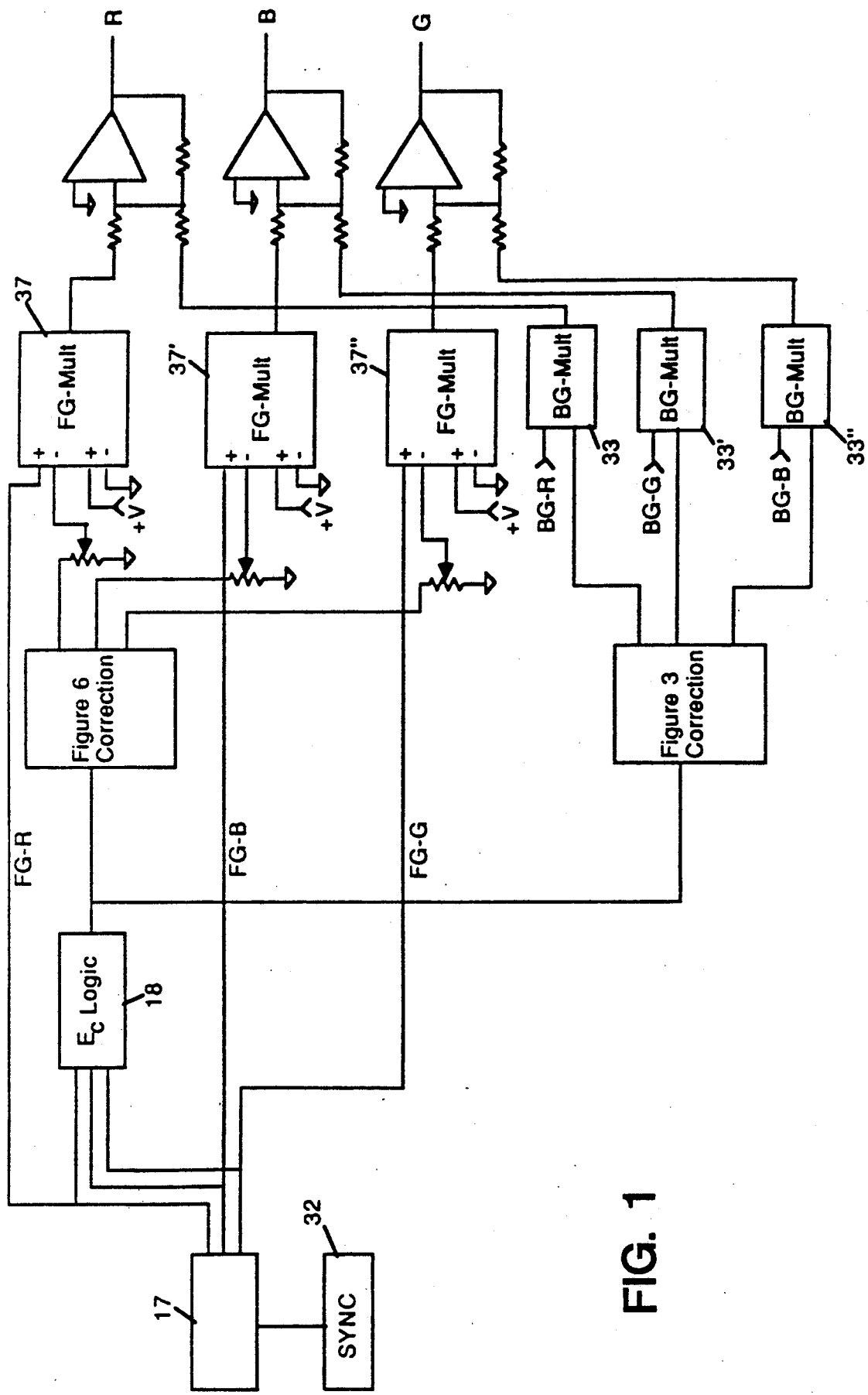
FIG. 1 is a block diagram showing a video composting system which may utilize the present invention.

The basic invention utilizes the deviation of the backing luminance and color from some ideal uniform value and corrects for such nonuniformity without disturbing or distorting the image quality of an FG subject. Nonuniformity correction can be achieved by comparing the video obtained with the subject in front of the blue backing with the video obtained from the blue backing alone. There are several ways of making and utilizing this comparison.

One such method examines the RGB video, makes its corrections and provides corrected RG video signals that include the subject. These corrected RGB video signals are the same as though the subject had been placed before a perfect backing. A second method operates to correct backing nonuniformities during the compositing process. This second method is described first.

THE $E_c$ CORRECTION METHOD

A control signal is developed from the criteria present in the colored backing, namely that when Blue is high and Red and Green are low, the camera is examining a picture element consisting of the blue backing. However, when either red or green is high, or blue is low, then the camera must be examining a nonblue subject. An equation or logic as simple as $E_c = B - (G \text{ OR } R)$, where OR signifies "the larger of", will provide a control signal Ec that is linearly proportional to the luminance and visibility of the backing, being 1.0 in the blue backing area, zero in the nonblue subject area, and somewhere between zero and 1.0 in semitransparent subject areas. A preferred control signal is shown by the following equation and is implemented by the circuit drawing of FIG. 2. The circuit of FIG. 2 and its various elements are fully explained in applicants prior patent, U.S. Pat. No. 4,344,085, FIG. 2, and the discussion in columns 3, 4, 5, 6, 7, 8.

$$E_c = \left[\frac{R4}{R3} + 1\right] \times \qquad \text{Eq. 1}$$

$$\left\{\left[\frac{R6 + [K7R7] \| [(1-K7)R7 + K8R8]}{R5 + R6 + [K7R7] \| [(1-K7)R7 + K8R8]}\right] + \right.$$

$$\left. E4\left[\frac{K7R7}{R7 + K8R8}\right]\right\} -$$

$$\frac{R4}{R3}[K9[K1E1 \text{ OR } K2E2] + (1-K9)[K1E1 \text{ AND } K2E2]]$$

$E_c$ will contain those variations due to nonuniformity of blue backing luminance. It is the variations induced by nonlinearities of the colored backing that need to be removed. Such variations can be removed by utilizing a previously stored $E_c$ control signal, which does not include the FG subject, to modify the live $E_c$ control signal being generated by the video camera, which does include the FG subject.

Specifically, since $E_c$ is used to control the signal level of the BG scene, it should have a constant level (e.g., unity). It is therefore necessary to store $E_c$ (or its reciprocal $1/E_c$) and upon its retrieval from memory, to multiply the live $E_c$ by the stored reciprocal of $E_c$ to form $LE_c$ (luminance corrected $E_c$). This action causes $LE_c$ to have a fixed value of unity (1.0) thus completely eliminating seams, wrinkles, blue set pieces and the effects of nonuniform backing illumination.

$E_c$ is subtracted from the FG scene video to reduce the blue field area to zero video (black). Because the backing luminance is nonuniform, $E_c$ is and must remain identically nonuniform if it is to cancel out the video of an unevenly lighted backing. The live, uncorrected $E_c$ is therefore utilized, by subtraction, to reduce the blue backing region to zero video. (In switching systems, the blue backing is reduced to grey).

After such subtraction, the blue floor area, or a blue set piece, may not quite cancel to zero due to a slight change in color as compared to the vertical section of the backing. This residual video can be thought of as an error signal and when obtained with the FG subject removed, it can be stored in memory. Upon retrieval, the error signal is used to modify the live $E_c$ (with subject in place) so as to achieve zero video in all areas of the blue backing not obscured by the subject.

Corrections to $E_c$ as described will permit the use of backings having nonuniform luminance and nonuniform color to produce flawless composite images without the prior art correction penalties of bright edges, dark edges or lost detail. FIG. 1 illustrates the additions of correction circuits 3 and 6 to a prior art video compositing system for correcting an $E_c$ for backings having non-uniform luminance and color.

An apparatus to achieve compensation for nonuniform luminance by correction of the $E_c$ control signal is shown in FIG. 3. Its function is as follows: The blue backing 17 is scanned before a subject 10 is put in place. $E_c$ logic 18 provides a control signal proportional to the luminance and visibility of the blue backing in accordance with equation 1.

Linear OR gate 20 limits the lowest value of $E_c$ to a voltage set by control 21. This OR gate prevents reciprocal circuit 29 from searching for infinity when $E_c$ goes to zero at the end of each scan line. Typically, control 21 will be set to some practical limit such as 0.5 of peak $E_c$. Closure of switch 28 provides $E_c$ through OR gate 20 to reciprocal circuit 29, to store $1/E_c$ in memory 30. Switch 28 is then released and subject 10 is put in place. With switch 28 open, $E_c$ is connected only to the X input of multiplier 31. The corrections stored in memory 30 are connected to the Y input of multiplier 31. The output of multiplier 31 is the product of the $E_c$ at a given point in the scene, and the stored value of an $E_c$ reciprocal at that point. A sync signal created by sync generator 32 provides synchronization between the scanning beam of the video camera and the reading and writing of memory 30.

In any area occupied by an opaque subject 10, $E_c$ will be zero. The fact that it is being multiplied by a factor of a little above or below unity, does not change the value of zero. The output of multiplier 31 is therefore a corrected $E_c$ (LE$_c$) which is now unity for the entire backing, and zero for the FG subject area. This is what $E_c$ would have been without correction if the backing had been illuminated with perfect uniformity. The output of multiplier 31 is connected (through level control 25) to the Y input of multiplier 33 which is the customary control point for the BG video in a linear compositing system. In a nonlinear compositing system such as tones using the chromakey switching technique, the output of multiplier 31 is the corrected keying (switching) signal that switches between the FG and BG scenes. In this connection, a control signal identifying the presence or absence of the blue backing is referred to as the key signal.

The circuit of FIG. 3 may be implemented with the following electronic components: $E_c$ logic 18 may be implemented according to the circuit shown in FIG. 2. (See, U.S. Pat. No. 4,344,085.) Switch 28 may be any commercially available switch such as a toggle switch. Controls 21 and 25 are commercially available potentiometers. Reciprocal circuit 29 may be implemented as a multiplier having an input connected to switch 28 and a second input connected to a source of 1 volt wherein the multiplier is connected as a divider. (See Motorola "Linear Circuits" handbook.) This multiplier as well as multipliers 31 and 33 are commercially available components, for example, the Motorola 1495 and 1595 four quadrant multipliers. Sync generator 32 is also commercially available such as Tektronix Model SPG 170A NTSC sync generator. Memory 30 may be any memory capable of storing a video signal such as magnetic tape. Appropriate video recorders and play back units are well known to those skilled in the art. Alternatively, memory 30 may be implemented as a digital random access memory, in which case analog to digital and digital to analog converters would be needed to convert the analog video signal to a digital signal for storage in memory 30 and then back to analog form for input to multiplier 31. Such memories, complete with A/D and D/A converters are commercially available frame store memories.

PENALTY

The foregoing method of correction for luminance nonuniformity may or may not incur a penalty depending upon other factors. The fact that the control signal $E_c$ could be raised, for example, from 0.5 to 1.0 (to correct a dark corner) means that 6 db of gain may be required. This means that the noise inherent in $E_c$ is raised by 6 db. If the camera which generates the RGB signal input to $E_c$ logic 18 has sufficient signal to noise ratio, a 6 db increase in noise may go unnoticed. Even if the noise would go up 6 db, no edge glow would occur. Areas of the backing generating an $E_c$ above 1.0 will have a reduced noise level since gain will be reduced to achieve $LE_c=1.0$. Since the entire backing will have a constant $LE_c$ of 1.0 volt, it is possible to push the entire $LE_c$ into a very modest clip thus eliminating $E_c$ induced noise. If all of the backing is lighted sufficiently to achieve an $E_c$ at or above 1.0, then there is no penalty for correcting $E_c$ to $LE_c$.

The method and circuit described in FIG. 3 corrects only for a backing whose luminance is nonuniform. It does not correct for color nonuniformity.

Loading the $E_c$ memory to correct for backing luminance nonuniformity by the method described in conjunction with FIG. 3, requires the availability of the backing without the subject being present. However, compositing often occurs in post production and the post production facility may have no control over the initial photography (or taping) and likely as not every frame in the scene will include the subject. However, it is still possible to load the memory with an $E_c$ that represents only the backing.

Since $E_c$ is highest in a clear area of the backing and is reduced by any subject matter, and is in fact zero when the subject is opaque, any backing area not occupied by the subject will have a higher $E_c$ than an area occupied by the subject.

If $E_c$ is loaded into memory on the first frame of the scene, the memory will be loaded including the area obscured by the subject, which will be loaded with zeros since $E_c$ is zero in the subject area.

As the scene is run to its end, the $E_c$ values obtained from each frame are examined. The current $E_c$ is compared with the stored $E_c$ and if the current $E_c$ is greater, its value replaces the stored $E_c$.

In this manner $E_c$ for all areas of the backing that will be visible during the scene have been loaded into memory. Any areas on the backing that are not uncovered by the subject's motion do not need correction since the will never be seen by the camera.

The memory loading method described above may be implemented with the apparatus shown in FIG. 4. $E_c$ logic 18 delivers $E_c$ to switch 45 which, when closed, delivers $E_c$ to OR gate 46. The other input to OR gate 46 is the output of memory 49. Since memory 49 begins with an empty memory, $E_c$ for the first frame is loaded into memory 51. At the end of a frame (two vertical blanking pulses for interleaved video) switch 53 releases switch 45 and closes switch 55 and also switches memory 51 to "read" and memory 49 to "write". $E_c$ for the second frame of video is now compared with the stored $E_c$ from memory 51 in OR gate 57. The larger $E_c$ is stored in memory 49.

The following table illustrates the condition of switches 45 and 55 and memory 49 and memory 51 for odd and even frames.

| FRAME | SWITCH 45 | SWITCH 55 | MEMORY 51 | MEMORY 49 |
|---|---|---|---|---|
| 1, 3, 5 etc. | closed | open | write | read |
| 2, 4, 6 etc. | open | closed | read | write |

A sync pulse from sync generator 32 synchronizes the $E_c$ in and out of memories 49 and 51 to be in time with video. The switches 45, 53 and 55 are solid state switches such as Harris HI301. The memories are integrated circuit frame store memories made by a number of manufacturers.

Although two memories are shown to aid in explaining the $E_c$ replacement method, in practice only one memory would be used. The time allotted to each address is divided into two parts, the first half of the time period reads the existing $E_c$ at the given address for comparison with the $E_c$ from the new frame being examined. If the new $E_c$ is greater, it replaces the data at the given address during the second half of the time period; if smaller, the existing data at the given address is unchanged. After all the frames of video have been examined, the data stored in memory 51 represents the blue field that will be seen by the camera. Having been loaded, memory 51 becomes memory 30 of FIG. 3.

CORRECTION FOR BACKING COLOR NONUNIFORMITY USING A SINGLE MEMORY

Assuming a blue backing and a blue floor are used, the color of the backing and floor will appear to have slightly different shades of blue or vary in blue saturation as a function of the angle between the blue surface to the light source and to the camera. Under certain combinations of angles, a diffuse surface reflection of a white light component desaturates the blue color.

Figure 5:
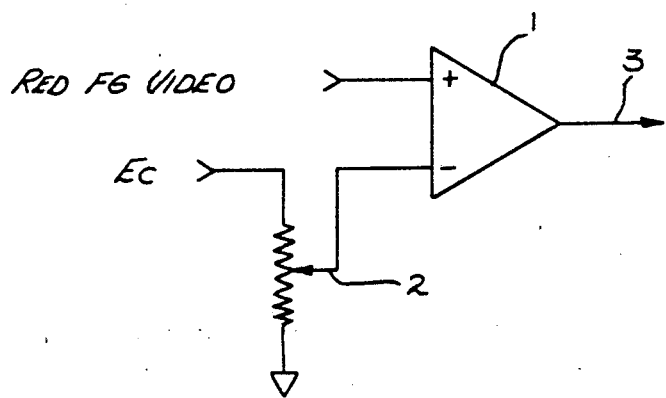
FIG. 5 is a schematic drawing of a circuit for implementing the subtraction of a percentage of $E_c$ for a single color video signal.

If the backing color is uniform, even though the illumination varies from full illumination to full darkness, a specific level of $E_c$ will equal the level of the video signal for each color component, and their subtraction reduces the blue field exactly to zero (i.e., black) simultaneously over the entire backing surface. The percentage of $E_c$ to be subtracted from each color will be referred to as bias. FIG. 5 shows a circuit (which forms part of the prior art) for implementing this subtraction method for one color (R, B or G). Since $E_c$ is proportional to the video signal, when control 2 provides a level of $E_c$ equal to that of the video signal for one color (R, B or G) into differential amplifier 1, its output 3 will be zero.

When a white light component is added to the FG RGB video signals due to surface scattering, each of the color components of the backing is increased, but $E_c$ remains constant as shown in the following table. Assume $E_c = B - G$, then:

| | Blue | Green | Red | $E_c$ |
|---|---|---|---|---|
| Typical color components | .7 | .4 | .3 | .3 |

-continued

|  | Blue | Green | Red | $E_c$ |
|---|---|---|---|---|
| of blue wall | | | | |
| Typical color components of blue floor | .7 | .4 | .3 | |
| Typical color components of scattered white light | .1 | .1 | .1 | |
| Typical color components of blue floor and white scatter | .8 | .5 | .4 | .3 |

The addition of a white light component does not influence $E_c$ and the control signal $E_c$ will be identical for both wall and floor. However, the actual red, green and blue components of the floor color have increased by 0.1 volts while the signal ($E_c$) to be subtracted has not increased. Therefore each color will have a residual video level of 0.1 volts in the floor area. Thus, the entire blue set will go black except for the floor. Whatever residual level remains in the floor area will be transferred and superimposed upon the background scene. In order to cause the floor to go black without the back wall going below black, it is necessary to increase the subtraction signal (bias) by 0.1 volts, but only in those areas (such as the floor) having a residual video.

Generally, the disclosed method and apparatus cannot operate from the live video which includes the subject because there are no criteria by which one may differentiate between residual floor video and thin white fog, for example. Therefore, the present invention obtains its correction information from a memory whose data was generated from the blue set before the subjects are put in place.

An apparatus for implementing the invented color correction is shown in FIG. 6. The scanned field 17, with FG subject removed, delivers RGB video to $E_c$ logic 18. $E_c$ is connected to the positive X input of multiplier 34. Multiplier 34 is configured for unity gain so that when both X and Y inputs are 1 volt, their product is one volt. The correction values are stored in memory 40 by the following procedure: set switches 35 and 39 to "MANUAL". In this position, the output of multiplier 34 is the product of $E_c$ and the voltage setting of potentiometer 36. To illustrate, assume $E_c = 1$ volt, and the blue video from a well illuminated area of the blue backing is 0.7 volt. Control 36 is adjusted to obtain −0.7 volt into the negative Y input of multiplier 34, which results in +0.7 volt (0.7×1.0) out of multiplier 34 and into the negative X input terminal of FG multiplier 37. Since both multiplier 37 and differential amplifier 38 have differential inputs receiving the sam (equal) signal, their outputs are zero. Typically, control 36 is adjusted to result in zero video in the best blue area of the backing. The floor area, due to white light scattering will not be at zero video because its blue video will likely be at 0.8 volts rather than at 0.7 volts. The output of amplifier 38 is the difference between its two differential inputs. If this difference is 0.1 volts, for example, then 0.1 volts is recorded in memory 40. This means that the blue bias must be increased by 0.1 volts in this area of the floor in order to achieve zero video. By first placing switch 39 and then switch 35 in the "RUN" position, memory 40 will deliver 0.1 volts to the positive Y input of multiplier 34. Since control 36 was previously set to 0.7 volts, the net input to the Y input of multiplier 34 is 0.7+0.1=0.8 volts, which then becomes the output of multiplier 34. This is the exact correction needed to achieve zero video output from multiplier 37. By causing amplifier 38 to provide a gain of a little over unity (e.g., 1.5), then control 41 becomes a scaling control so as to achieve exact cancellation of the residual video.

Since the correction comes from memory 40, the correction continues to be applied as a FG subject moves into and occupies a corrected area of the backing. Assume the subject is thin black smoke having a transparency of 50 percent. $E_c$ will drop to 0.5. Blue video will drop from 0.8 to 0.4 volts. The stored correction remains at 0.1 volts. The net input to the Y input of multiplier 34 is still 0.8 volts. Multiplier 34 XY product will be 0.8×0.5=0.4 volts. Thus, the correction of 0.4 V. at the negative X input of multiplier 37 exactly equals and cancels the positive X input blue video of 0.4 V. By a similar calculation it can be shown that this backing color correction method ideally corrects for all levels of transparency.

Figure 7:
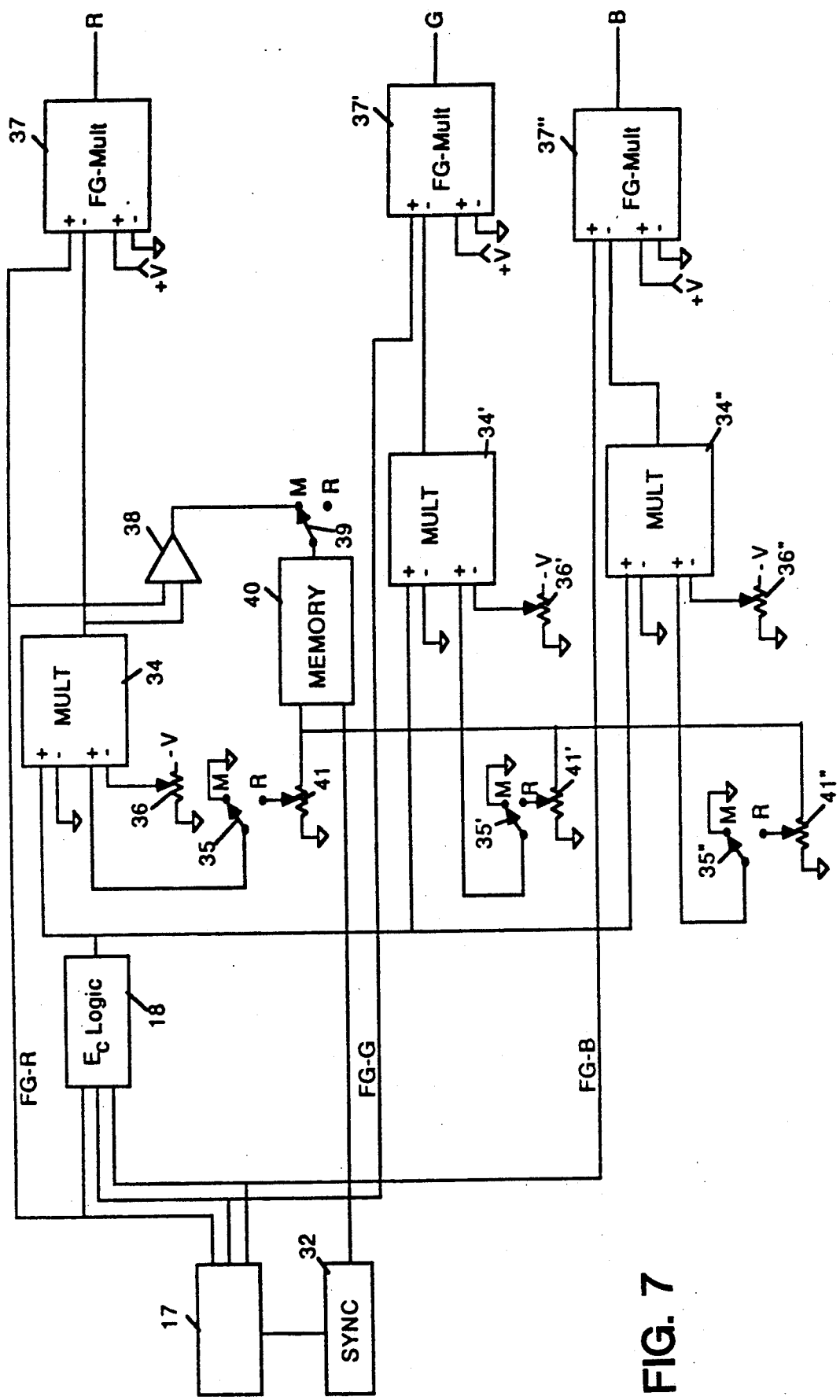
FIG. 7 is a block diagram of a circuit for implementing backing color correction for three color video signals using a single memory according to the present invention.

FIG. 6 illustrates the apparatus needed for the color correction of a single color signal (blue) only. FIG. 7 shows the apparatus required to color correct all three color video signals, as follows: Multipliers 34' and 37' and potentiometer 41' and 36' provide correction for the green video channel. Multipliers 34" and 37" and potentiometers 41" and 36" provide correction for the red video channel. In this embodiment, only one memory 40 and one differential amplifier 38 is used.

The most common source of color nonuniformity is caused by a white diffuse component superimposed over the blue floor's normal blue reflection. While each channel must have its own bias control 36, 36' or 36" and scaling control 41, 41' or 41", the error data supplied by examining one channel (e.g., blue) will provide adequate compensation for floor glare.

Figure 8:
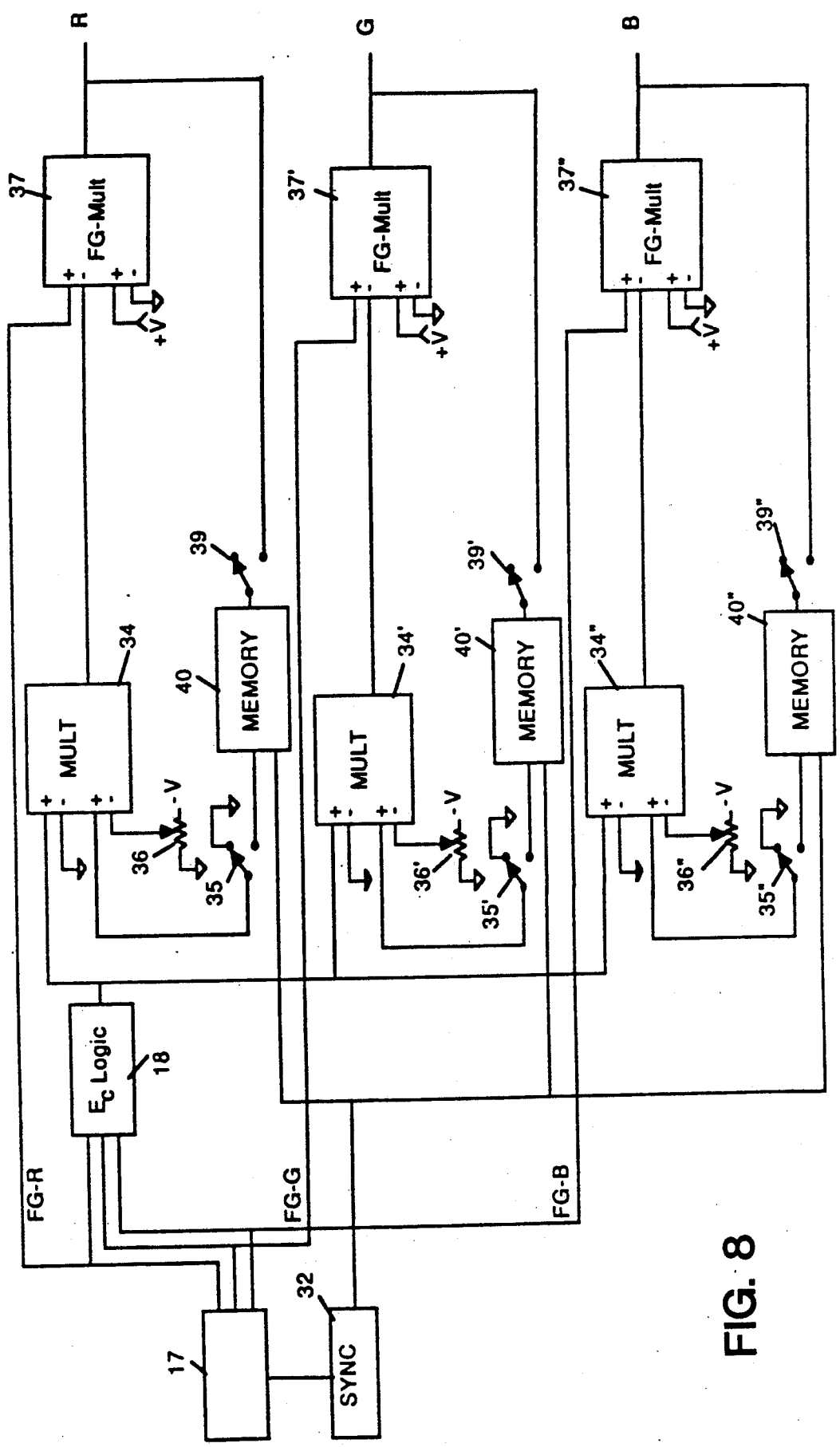
FIG. 8 is a block diagram of a circuit for implementing backing color correction for three color video signals using three memories according to the present invention.

One could, of course, employ a memory 40 and switches 35 and 39 for each channel and thus color nonuniformity is independently corrected for each color. Independent correction is required when color deviations differ for each color. FIG. 8 illustrates the use of independent memories. Note that the differential amplifier 38 and scaling potentiometer 41 of FIG. 6 and 7 are omitted in FIG. 8. When using independent memories the residual color error occurring at the output of multipliers 37, 37' and 37" are in each case the exact amount of color error to be corrected for that color. Therefore the gain provided by differential amplifier 38 of FIG. 7 and level adjustments provided by controls 41, 41' and 41" of FIG. 7 are no longer needed.

The use of independent memories as shown in FIG. 8 provides for any range of color deviation and even permits blue set pieces to be painted with blue paint of differing manufacture and differing blue pigments.

The three memories shown in FIG. 8 may be digital random access memories, or a component video tape machine.

One commercial compositing device (sold under the trademark ULTIMATTE), employs a blue clamp such that the blue video cannot exceed the green video. Since in a blue backing, the blue component is always higher than the green component, the blue is always held to the level of the green and is thus equal to green in the backing area. Therefore, in FIG. 8, the blue memory is redundant for such a compositing system employing a blue clamp. The correction for the blue video channel may be obtained from the green memory 40' of FIG. 8 with appropriate level control such as control 41" of FIG. 7.

Figure 8A:
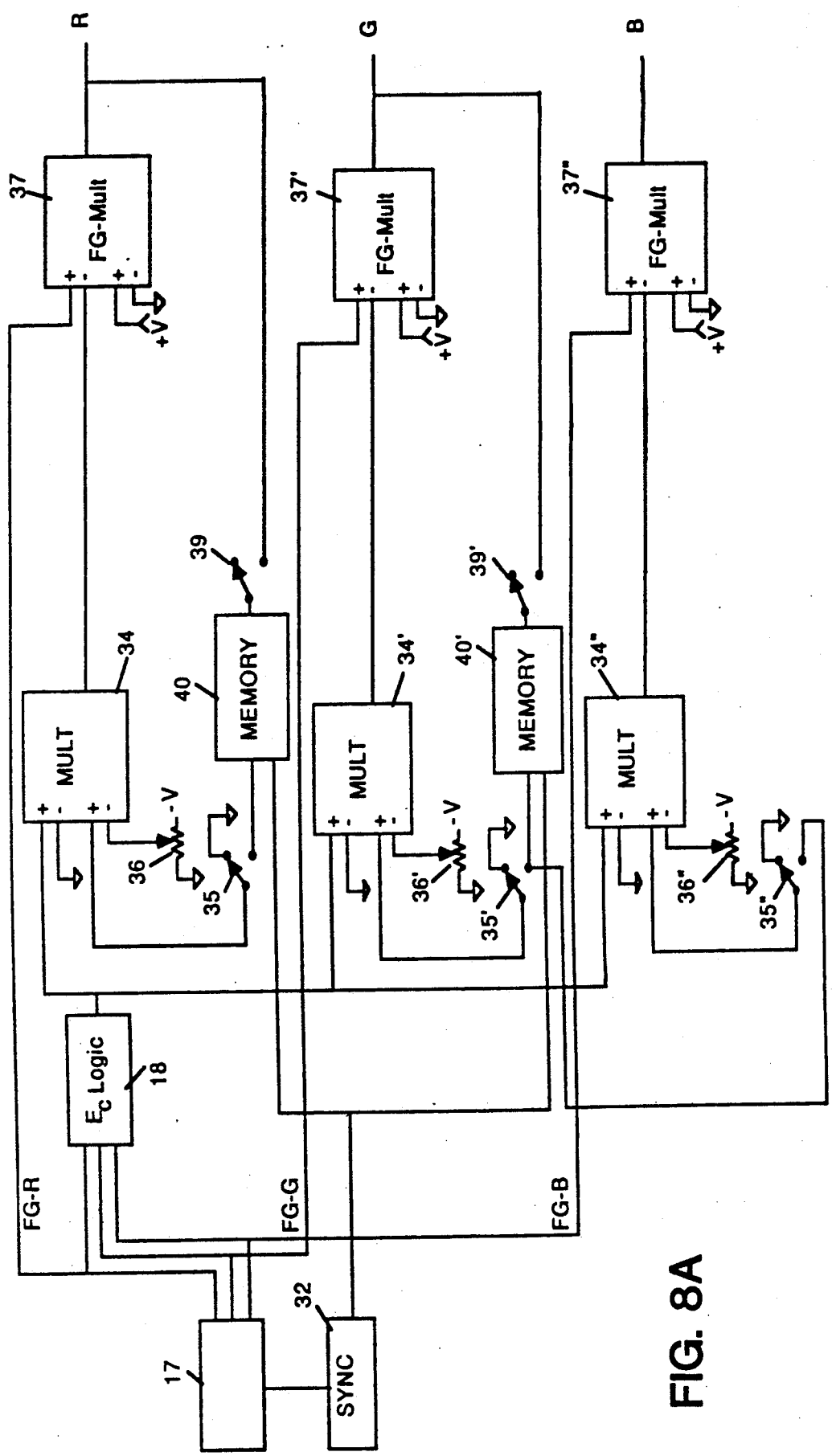
FIG. 8a is a block diagram of a circuit for implementing backing color correction for three color video signals using two memories according to an alternate embodiment of the present invention.

FIG. 8a illustrates a circuit for implementing such embodiment.

A three channel video tape recorder would then satisfy the memory requirements for both luminance correction and full color correction. One tape channel would be used for luminance memory, while the remaining two tape channels would be used for red and green color memories 40 and 40'.

AN ADDITIVE CORRECTION METHOD FOR BACKING NONUNIFORMITY USING RGB STORAGE

The colored backing is nonuniform because one or more of its color components, RGB, are not constant over the entire backing area.

If one compares the actual values of RGB video with the ideal values of RGB video, the difference is the amount by which actual video deviates from the video that would have been obtained from an ideal backing.

If these deviations are placed in memory, they become corrections when added back to the actual RGB video. This correction, by addition, causes the colored backing video to be perfectly uniform. Unfortunately, the corrections are also added to the subject instead of the backing in the area occupied by the subject. It is an appropriate correction method if the backing itself is clean and seamless and is nonuniform only at its corners, which are not to be occupied by the subject. The method, as described is not practical when the subject may wander anywhere within the camera field. A more practical method of employing the additive correction method is to fully inhibit the corrective action in the area occupied by an opaque subject, and to partially inhibit the corrective action in partially transparent subjects. Ideally, the correction to be added back to the video should vary in a linear manner proportional to the visibility of the backing. Control signal $E_c$ is proportional to the luminance (and visibility) of the backing and is therefore an ideal control to inhibit the corrective action. For this purpose, a clip circuit is employed which can be set to represent an $E_c$ derived from the lowest level of backing illumination. Thus, the corrective action is not inhibited above this level which is the range that needs correcting.

APPARATUS

Figure 9:
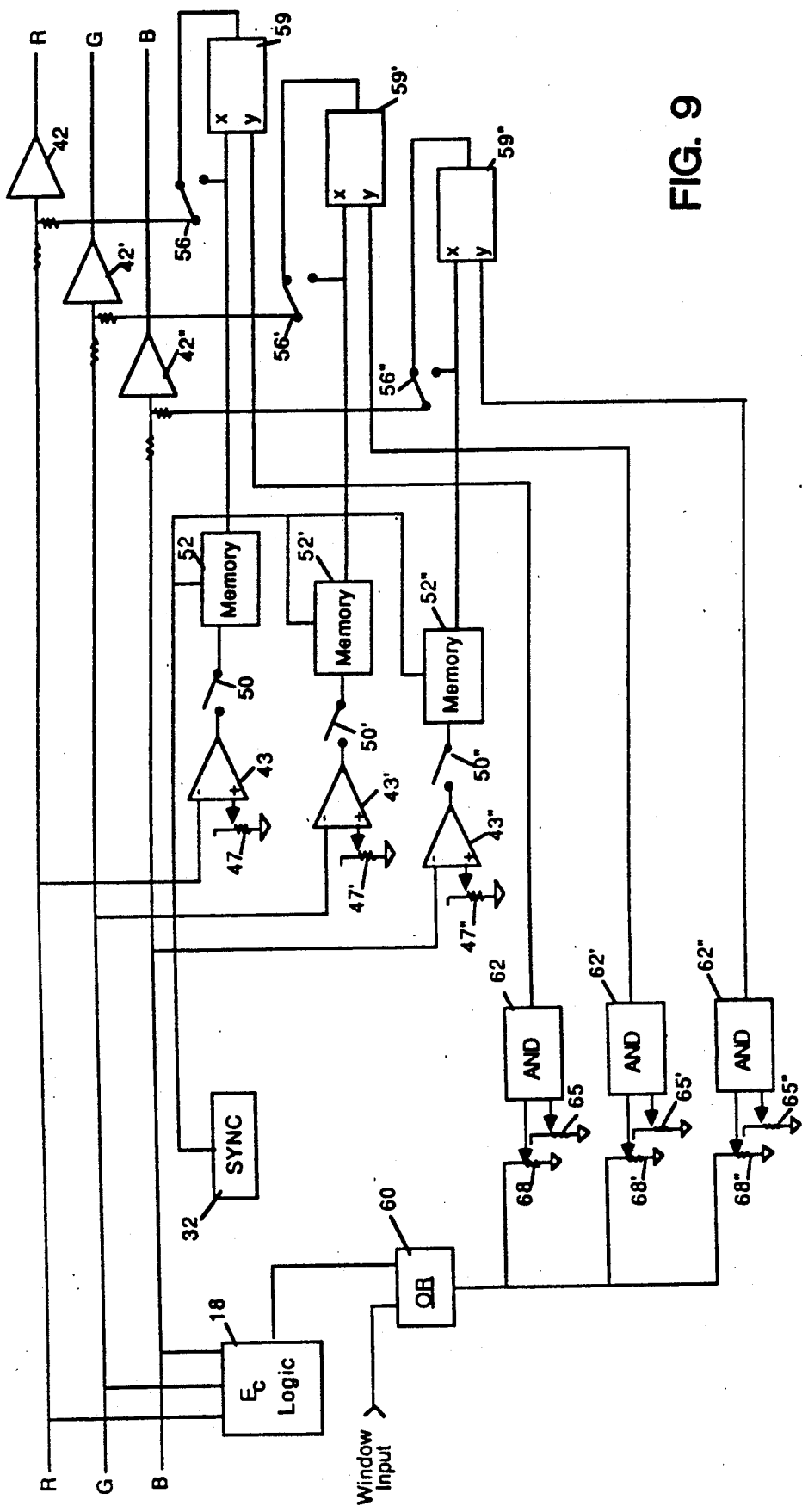
FIG. 9 is a block diagram of a circuit for implementing backing color correction using additive correction according to an alternate embodiment of the present invention.

The apparatus for accomplishing the additive method of nonuniformity correction, with and without the inhibit function is illustrated in FIG. 9 and functions as follows:

RGB from the scanned field, in the absence of the subject, is connected to $E_c$ logic 18 and to the additive amplifiers 42, 42', 42'' and to differential amplifiers 43, 43', 43''. Controls 47, 47' and 47'' are set for a voltage that represents that ideal video voltage that a perfect backing of perfect illumination would have provided. These voltages are connected to the positive inputs of differential amplifiers 43, 43', 43''. The actual RGB video is connected to the negative input of amplifiers 43, 43', 43''. The output of differential amplifiers 43, 43', 43'' (which may be positive or negative) is the amount by which the actual video deviates from the ideal. Momentary closure of switches 50, 50', 50'' inserts these deviations into memories 52, 52', 52''.

Sync generator 32 provides that the correction signals leaving the memory are synchronized with the RGB video at summing amplifiers 42, 42', 42''.

When switches 56, 56' and 56'' are in the lower position, the correction voltages are connected directly to the summing amplifiers 42, 42', 42''. The corrections are therefore not inhibited in the subject area.

Memories 52, 52', 52'' are also connected to the X input of multipliers 59, 59' 59''. Ec via OR gate 60, and AND gates 62, 62', 62'' are connected to the Y inputs of multipliers 59, 59', 59''. The output of these multipliers are connected to the top (up) position of switches 56, 56', 56''.

$E_c$, being approximately unity in the backing area causes multipliers 59, 59' and 59'' to pass the correction voltage at full level. Since $E_c$ is zero in the subject area the output of the multipliers 59, 59', 59'' will be zero. The backing corrections are therefore inhibited in the subject area when switches 56, 56' and 56'' are in the up position.

Controls 65, 65', 65'' set DC voltage representing the clip point for $E_c$. Controls 68, 68', 68'' set the level into clip so that $E_c$ inhibits the multipliers only below the set value. Corrections are fully effective above the clip level and are linearly reduced to zero below the clip level.

Compositing devices normally employ built-in window circuits o obtain a desired window from the switcher which is associated with the compositing device. The window circuit provides a "1" on one side of a window edge and a "0" on the other side. This "1" or "0" may be used to operate a gate or switch.

Utilizing the window circuit permits the selective use of the inhibit function so that it operates only in a selected area.

Referring to FIG. 9, assume: switches 56, 56', 56'' are set to the inhibit (up) position; that a window has been placed to encompass the subject; that the window signal is "0" inside the window and "1" outside the window. Assume also that the camera overshoots the backing and thus includes the normal clutter of cables, lighting stands, ladders, etc. With the subject removed, all deviation of RGB from the ideal values set by controls 47, 47', 47'' will be recorded for all areas of the stage within the camera field of view.

With the subject in place, the $E_c$ signal that is generated by $E_c$ logic 18 will be zero where there is no blue backing. This includes the subject area and all the area outside the blue backing seen by the camera. This means that corrections are inhibited for the subject, but outside the subject the video represents the blue backing area, or the window area, and either will represent a "1" to the OR gate 60, and therefore the corrections are applied over the entire camera field excepting a subject lying inside a window.

Figure 10:
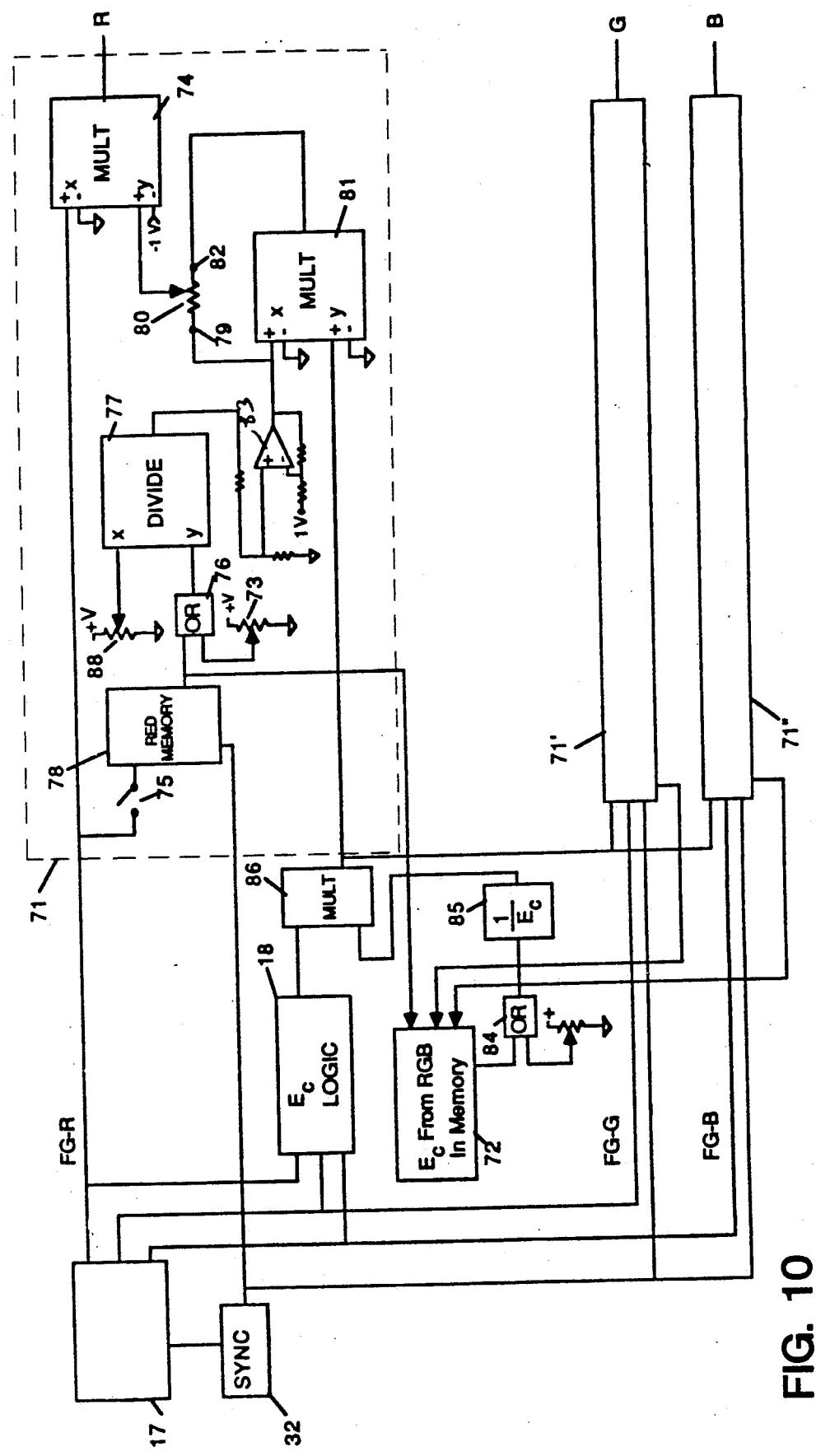
FIG. 10 is a block diagram of a circuit for implementing backing color correction using multiplicative correction according to a second alternate embodiment of the present invention.

All of the stage area outside the blue backing but in the camera field will be eliminated by the correction data and be replaced by video representing the ideal colored backing. In rare instances it may be desirable to partially inhibit the correction in the subject area. In this case switches 56, 56', 56'' would be replaced by potentiometers 58, 58' and 58'' as shown in FIG. 10. Each such potentiometer still permits zero, or full inhibition, representing the two extreme positions of the potentiometer.

The output of amplifiers 42, 42', 42'' substitute for the original RGB camera signals and are to be routed to the Ultimatte, or chromakey compositing devices, or to a tape recorder for later compositing.

The additive method for correcting for nonuniform luminance and color is therefore a signal conditioning method and does not require compositing at the time the signal is being conditioned. It should be noted in FIG. 9 that the RGB video, obtained from the backing when the subject is absent, is being compared to a reference standard and the deviation is stored in memory. Exactly the same results are obtained if the RGB video, obtained from the backing when the subject is absent, is directly stored in memory and thus comparitors 43, 43', 43" would obtain their video from memory. In effect, comparitors 43, 43', 43" and corresponding memories 52, 52', 52" are simply interchanged. This has the advantage of permitting manipulation of constants 47, 47', 47" without reloading the memories.

The inhibit action of $E_c$ does not begin to function until $E_c$ has dropped below the ceiling set by controls 65, 65', 65" and 68, 68', 68". This ceiling must be set fairly close to the R G B levels of the backing if subject edge anomalies are to be avoided. The use of a window to surround the subject permits such close settings. Outside the window, there is no limitation on the extent of non-uniformity even to the point of no backing at all.

The use of a corrected $E_c$ to act as the inhibitor removes most of the limitation of non-uniformity within the window. The corrected $E_c$ for use as inhibitor is described in the multiplying correction method described next.

A MULTIPLYING CORRECTION METHOD

In a blue backing, the voltage values of B, G, R can be B=0.7, G=0.4, R=0.3, when the backing is uniformly illuminated. If non-uniform, red for example, could vary from 0.2 to 0.4 volts. Assume that 0.3 volts is an ideal value for red. One can then compare the actual value with an ideal value and utilize the quotient to correct the existing red video to an ideal and constant level. This is explained by reference to FIG. 10.

In this method, the blue field 17, with subject removed, is scanned to produce RGB FG video which is connected to $E_c$ logic 18 and to red correction circuit 71, green correction circuit 71' and blue correction circuit 71". Since circuits 71' and 71" are duplicate of red correction circuit 71, only circuit 71 will be described in detail.

The red video entering the red correction circuit 71 is connected to the X input of multiplier 74. It is also connected to switch 75. A momentary closure of switch 75 connects red video to memory 78. Memory 78 is a tape, digital RAM, disc, etc. that stores all the values of red video for a full frame.

Red video from memory 78 is connected to OR gate 76. A DC voltage from control 73 is connected to a second input of OR gate 76, and serves the purpose of preventing the divide circuit 77 from seeking infinity when the red video signal goes to zero at the end of each scan line. The red video (from OR gate 76) is then connected to divide circuit 77 whose Y input is the designated denominator A DC voltage from control 88 is connected to the X input of divide circuit 77 as the numerator.

The output of the divide circuit 77 is connected to operational amplifier 83 so as to introduce a 1 volt offset. The output of amplifier 83 is connected to multiplier 81.

When there is no deviation from the ideal of 0.3 volts, the quotient will be 1.0, and with an offset of 1.0, the output of the amplifier 83 will be zero. The output of multiplier 81 will therefore be zero and no correction is made to red video.

In the foregoing example, the ideal value of red video from the blue backing is 0.3 volts. Control 88 is therefore set to 0.3 volts. With red varying from 0.2 to 0.4 volts, the quotient will vary form 1.5 to 0.75. When the wiper of potentiometer 80 is at point 79, 1.5 volts will appear at the Y input to multiplier 74 when the live red video is 0.2 volts at the X input to multiplier 74. This product is therefore 0.3 volts. A voltage of 0.75 will appear at the Y input to multiplier 74 when its X input is at 0.4 volts. Their XY product is again 0.3 volts. Thus, the entire backing will appear to have a red signal level of 0.3 volts.

As long as control 80 wiper is at point 79, all red video, including that contained in the subject, will be multiplied by the factor present at the Y input to multiplier 74. This means that the subject as well as the backing will be subjected to non-uniformity correction. If such non-uniformity is due to lens vignetting, or to unevenlighting, then both backing and subject require correction, and such correction is applied without color distortion by the above-described method.

If the non-uniformity is caused by flaws in the backing (seams, rub marks, etc.) then the correction should be applied only to the backing area and not to the subject. This can be done by inhibiting the correction signal so that it is not applied in those areas occupied by subject matter. Such inhibiting can be accomplished by utilizing $E_c$ as developed by $E_c$ circuit 18. $E_c$ is typically unity in the backing area and zero in the subject area.

If the output of $E_c$ circuit 18 was to by-pass multiplier 86 and go directly to the Y input of multiplier 81, then the output of multiplier 81 would be inhibited (made zero) in the areas occupied by a subject. By placing the wiper of control 80 at point 82, the correction voltages are inhibited in the subject area and red video will be unaffected. This procedure is effective and produces no subject edge anomalies (e.g. dark or light) as long as the backing non-uniformity is quite moderate. If significant non-uniformity exists, the output of Ec generator 18 must not by-pass multiplier 86.

By utilizing $E_c$ circuit 18 which includes the subject, together with $E_c$ from circuit 72 which is obtained from the RGB in memory, as well as circuit 85 and multiplier 86, the backing may be substantially non-uniform and not create edge anomalies. These circuits function as follows. $E_c$ live from circuit 18 and $E_c$ (72) from RGB memory are identical in the blue backing area not occupied by a subject. Both signals fluctuate however to represent the non-uniform illumination. It is large fluctuations that make $E_c$ (18) unsuitable as an inhibiting signal. Such fluctuations are removed by multiplying $E_c$ (18) with $1/E_c$ (72 and 85) in multiplier 86. $E_c*(1/E_c)=1.0$, which is a constant. However, as the video signal leaves the backing and enters a subject, $E_c$ (18) drops to zero and therefore the output from multiplier 86 drops to zero. Thus the output of multiplier 86 is nominally unity and drops linearly from unity to zero as the video signal transitions from the backing to the subject. This is what would have happened without correction, if the backing had been perfectly uniform.

It should be noted that the corrected $E_c$ generated by 18, 72, 85, and 86 may be used to replace the $E_c$ (18) signal connected to OR gate 60 of FIG. 9. Thus the additive method of compensation is now free to accept large luminance nonuniformities without subject edge effects.

Referring again to FIG. 10, the OR gate 84 maintains a small DC voltage to divide circuit 85 to prevent circuit 85 from searching for infinity when $E_c$ goes to zero at the end of a scan line.

The multiplying method of FIG. 10 can thus be applied to correct the entire scene including the subject. It also provides that the correction can be progressively inhibited to where only the backing is corrected by using control 80.

The RGB correction methods correct for both luminance and color non-uniformity. The multiply method does not induce color distortion of the subject when correcting the entire scene for lens vignetting.

Once RGB has been corrected, and idealized if desired, these signals may be connected to the input of the compositing device, or recorded for later compositing.

Because $E_c$ is required for correction, the circuits described herein may be incorporated, with internal or external memory, into a compositing device, thus eliminating duplication of $E_c$ circuitry. If built-in, the corrected RGB should be brought to the rear panel for recording. Thus the compositing device may be used for compositing or for signal conditioning.

The sync signal 32 synchronizes memory readout timing to that of the video signal.

MOVING CAMERA

It is possible to employ backing correction when the camera moves (i.e., pan, tilt, zoom or dolly) by utilizing a component tape machine as a memory. This device simultaneously records all three color video signals as independent variables.

When using the moving camera, it is necessary to employ a camera motion repeater 92 (see FIG. 11) that is commonly used in producing TV commercials. The motion repeater stores all camera movements, and when played back, causes the camera to exactly repeat those movements.

Figure 11:
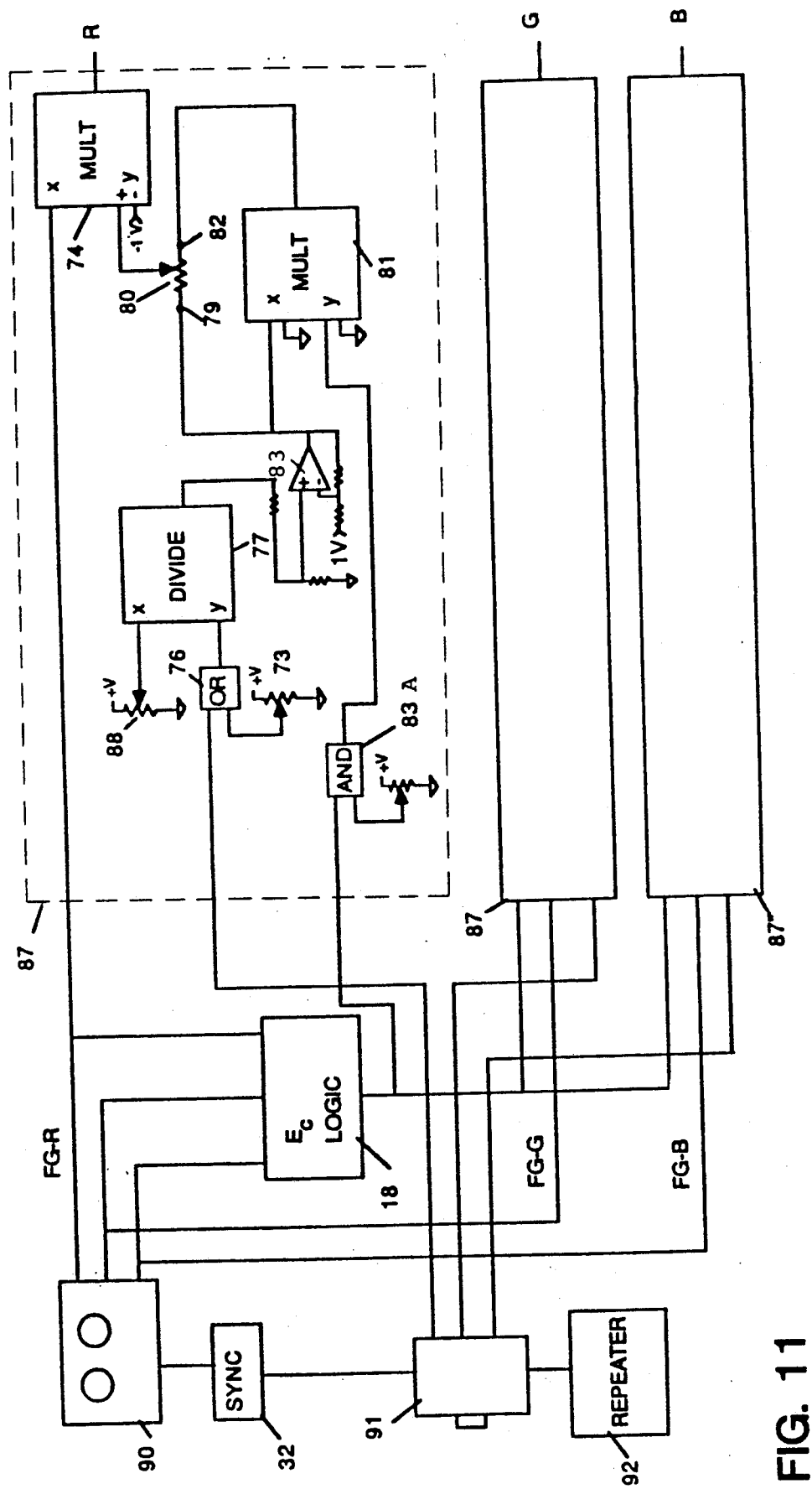
FIG. 11 is a circuit for implementing backing corrections according to the present invention when a moving camera is used.

FIG. 11 illustrates the backing nonuniformity correction method when the camera is in motion. The RGB video of the scene with FG subject in place in front of the blue backing, is recorded on tape memory 90. Camera 91 may be first used for this purpose and then reconnected as shown in FIG. 11.

With the subject removed, and with camera 91 under motion control, the blue backing is again photographed with the camera repeating all of its original motions.

As the camera begins this second take, tape memory 90 is started and runs in synchronism with the video from camera 91. All the conditions are therefore met for making full backing nonuniformity luminance and color corrections to the blue backing for scenes in which the camera is in motion.

The scene with subject removed is present from camera 91; the scene with subject in place is present in tape memory 90; the blue backing only video is limited by linear OR gate 76 and is divided into a selected reference level set by control 88 and the quotient in turn modifies the RGB video levels at multiplier 74. Multiplier 81 and control 80 provide for inhibit or noninhibit of corrections in the subject area.

Independent video data are available from recorder 90 and camera 91 for each field of video and therefore the camera is free to move. The same camera motion repeater with its stored record of motions will be used a second time to put the camera through its motions as the BG scene is being recorded on tape or film. All of the electronic components of FIG. 11 have been identified in the previous figures. Tape recorders, cameras and motion repeaters are those currently in use in TV productions. FIG. 10 and FIG. 11 are essentially identical when the camera 91 is considered as a replacement for memories 78.

It should be noted that FIG. 9, 10 and 11 provide a means for inhibiting the backing nonuniformity correction in the subject area.

The inhibit circuit of FIG. 10 has a live $E_c$ (18) that is used to inhibit backing correction in the subject area. However $E_c$ generated by logic 18 will include all of the luminance variations of the backing. These variations are eliminated by generating a second $E_c$ (72) from the RGB stored in memory and which does not include the subject. In the backing area, both $E_c$'s are identical. By multiplying in multiplier 86, the first $E_c$ (18) by the reciprocal of the second $E_c$ (from reciprocal circuit 25), $E_c$ becomes a constant of 1.0 in the backing area. In the subject area the first $E_c$ (18) drops to zero and thus shuts off the correction in the subject area.

This is an ideal method of backing correction since it corrects RG and thus eliminates both luminance and chroma variations. It is also ideal because the correction inhibitor, namely $E_c$, has first been corrected to eliminate its variations. Inhibiting thus begins exactly at the edge of a subject and is truly linear.

The correction inhibitor of FIG. 11 is much simpler that that of FIG. 10, and consists of a simple linear AND gate 83A. The second input to the AND gate 83A is a fixed voltage which is set to represent the video level found at a point on the backing having the lowest illumination. This simple AND gate 83A, and its associated control potentiometer, replaces in FIG. 10 be logic 72, OR gate 84, reciprocal circuit 85, and multiplier 86.

The correction inhibitor of FIG. 11 is satisfactory if the backing nonuniformity is not too severe, or if little or no correction is needed directly adjacent to the subject. When there is considerable nonuniformity, the reference voltage into AND gate 83 becomes quite low and thus the correction will extend slightly into the edges of the subject where no correction is wanted.

The correction inhibiting method of FIG. 11 may be used in FIG. 10. Also the correction inhibiting method of FIG. 10 may replace the elements of the inhibitor of FIG. 11, and FIG. 9.

LOADING AN RGB BACKING MEMORY WHEN THE SUBJECT IS IN PLACE

If one is to store the RGB video representing only the backing, then RGB video representing the subject must not be stored in memory. Since $E_c$ is zero for an opaque subject, $E_c$ may be used to inhibit the RGB video in the subject area. FIG. 12 represents the required apparatus. The blue video (shown) enters one input to a multiplier 93. $E_c$, after being clipped by AND gate 95, is connected to the other multiplier input. When $E_c$ is zero, the multiplier output is zero, thus the output of the multiplier is the video representing the backing only. If this blue video now substitutes for $E_c$ in FIG. 4, then blue video for the backing only is stored in memory. Duplicating the apparatus in FIG. 4 for the red and green video permits all three video signals to be stored in memory.

The memory of FIG. 4 is designed such that as each frame of video is examined, video levels of the current frame, if greater, replace the data in memory.

Thus, the technique of FIG. 4 for loading the memory with backing $E_c$ in the presence of the subject, is also applicable for loading RGB of the backing in the presence of the subject. The AND gate clip circuit of FIG. 12 sets the threshold below which the multiplier functions to inhibit subject video.

Applicant's existing patents, referenced earlier, function to composite video signals whether in their primary RGB form or in the form of an encoded signal whereby chroma is encoded as a phase angle of a subcarrier signal superimposed on a luminance (black and white) signal. In the United States, the NTSC standard employs a 3.58 megahertz subcarrier while in Europe the PAL standard employs a 4.43 megahertz subcarrier. Applicant's U.S. Pat. Nos. 4,409,611 and 4,589,013 describe Encoded Signal Color Image Compositing.

The correction systems described herein that correct for backing non-uniformity by correcting the RGB camera signals, apply to any compositing device of any type that employs the primary RGB outputs of the camera.

Figure 13B:
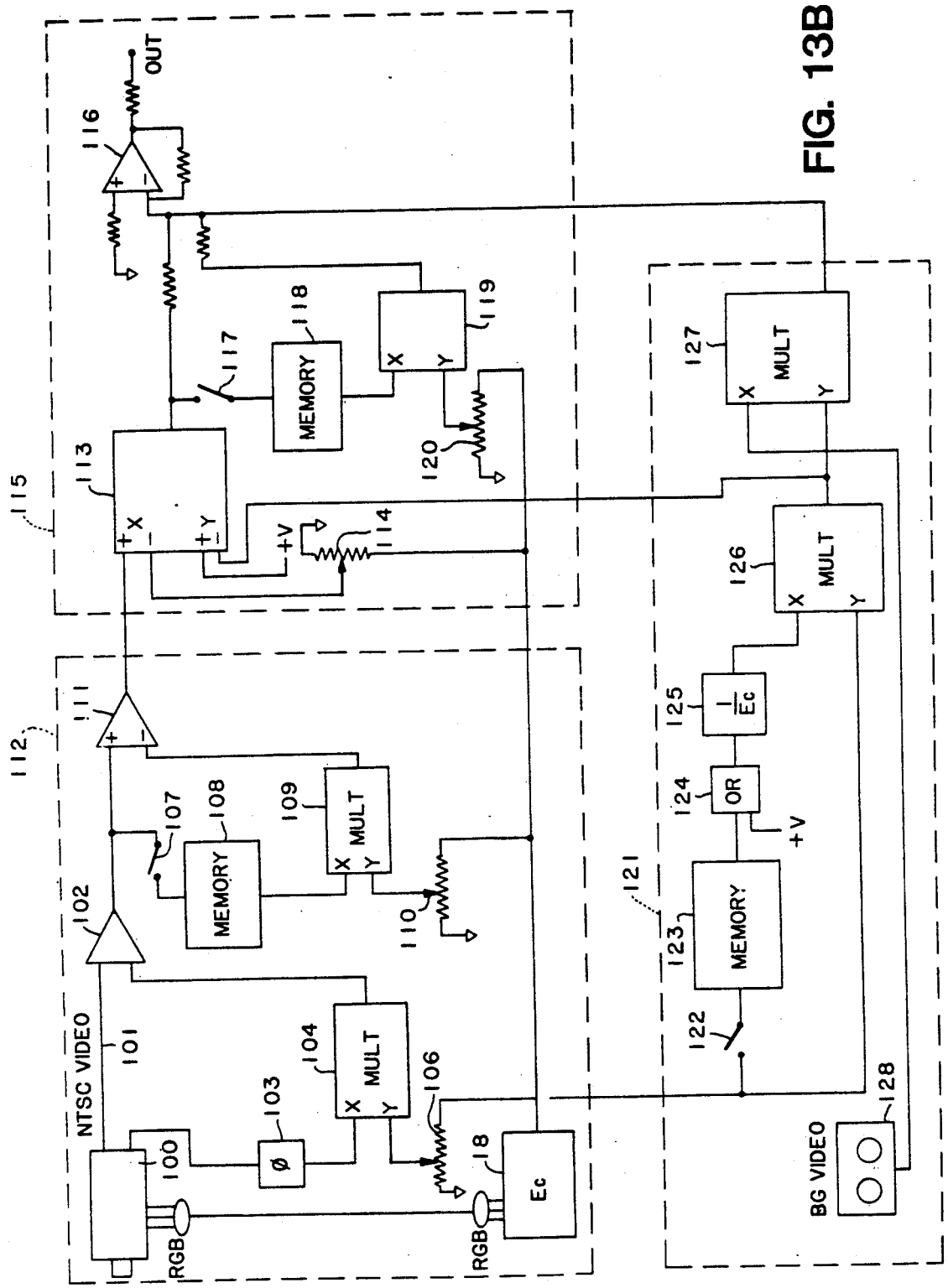
FIG. 13b is a block diagram of a circuit for implementing backing non-uniformity color and luminance corrections when the video is in the form of an NTSC or PAL color encoded signal with a switching type compositing device.

Backing non-uniformity correction may also be applied to compositing devices that accept encoded color video signals. This correction method is explained with the aid of FIGS. 13a and 13b and applies to both NTSC and PAL.

The FG scene camera 100 provides encoded color video to the positive input of differential amplifier 102 via line 101. The subcarrier signal, normally obtained from the camera 100, is connected to phase shifter 103. (Further details regarding phase shifter 103 may be found in U.S. Pat. No. 4,409,611, which issued Oct. 11, 1983, which refers to a phase shifter 12.) The phase shifted subcarrier from 103 is connected to the x input of multiplier 104. RGB from camera 100 is connected to $E_c$ logic 18 which generates a control signal based on the presence or absence of the chroma of the backing. The control signal $E_c$ is connected thru potentiometer 106 to the Y input of multiplier 104. The output of multiplier 104 is connected to the negative input of differential amplifier 102.

By adjusting the phase angle of the subcarrier signal at phase shifter 103, and by adjusting the amplitude of the phase adjusted subcarrier by means of control 106, the subcarrier signal arriving at the negative input of amplifier 102 ca be made to exactly match the phase and amplitude of the subcarrier at the positive input to amplifier 102 for a selected area of the backing. Since the two signals delivered to differential amplifier 102 are exactly in-phase and of identical amplitudes, all chroma of the backing is removed in those areas of the backing having a constant chroma. Since $E_c$ drops to zero in the subject area, the output of multiplier 104 drops to zero and the chroma of the subject is thus unaffected. However, the chroma of the backing and of blue set pieces may not have a constant chroma and thus in these areas, the output of amplifier 102 will include a residual chroma due to color non-uniformity of the backing which can be considered as an error signal.

REMOVAL OF CHROMA NON-UNIFORMITY

Referring now to FIG. 13A, by closing switch 107, with the subject removed, the error signal of the backing only is loaded into memory 108. The output of memory 108 is connected to the X input of multiplier 109. $E_c$ from Ec logic 18 is connected to the Y input of multiplier 109 via potentiometer 110. The output of multiplier 109 is connected to the negative input of amplifier 111. The output of amplifier 102 is connected to the positive input of amplifier 111. Note that in the blue backing area not occupied by the subject, the inputs to amplifier 111 are identical. Therefore the output of differential amplifier 111 will be zero and thus the residual chroma due to non-uniform color of the backing is removed. Since $E_c$ is zero in the subject area, multiplier 104 shuts off the chroma removal signal to amplifier 102, and multiplier 109 shuts off the chroma error correction signal to amplifier 112. Thus, the chroma in the subject area is undisturbed.

The above description explains correction for a backing (and blue set prices) whose color is non-uniform. The method and apparatus described applies equally well to all types of encoded color video compositing devices for the removal of non-uniform chroma (color) of the backing.

The portion of FIG. 13a for correction of color non-uniformity are the elements included in boxed area 112.

REMOVAL OF LUMINANCE NON-UNIFORMITY

The output of amplifier 111 contains the encoded video signal from which all chroma of the backing has been removed. This output is connected to the positive X input of multiplier 113. $E_c$ from circuit 18 is connected to the negative X input of multiplier via control potentiometer 114.

Since $E_c$ is proportional to the luminance of the blue backing, an adjustment of potentiometer 114 will cause the luminance to be reduced. For switching type chromakeyers, luminance is typically reduced to a middle grey to minimize edge effects. For non-switching devices (e.g. Ultimatte), control 114 is adjusted until luminance drops to zero in that area of the backing having the bluest color. In other areas of the blue backing, such as a blue floor, a residual luminance will remain and is caused by non-uniform color.

Removal of this residual luminance is accomplished in the boxed area 115 of FIG. 13a.

The residual luminance in the backing area occurs at the output of multiplier 113. Since this luminance signal is not desired and would not occur with a backing of uniform color, it is treated as an error signal. The negative output of multiplier 113 is connected to the summing input of amplifier 116, and to memory 118 thru switch 117.

The residual luminance (caused by color non-uniformity of the backing) is loaded into memory 118 by momentary closure of switch 117, and is done with the subject removed.

The output of memory 118 is connected to the X input of multiplier 119. $E_c$ is connected to the Y input of multiplier 119 via potentiometer 120. Since $E_c$ is zero in the area occupied by a subject, the output of multiplier 119 exists only in the backing area. The positive output of multiplier 119 is connected to the summing input of amplifier 116.

Since the negative output of multiplier 113 is exactly equal to the positive output of multiplier 119, and both appear at the summing input to amplifier 116, the residual luminance is reduced to zero in all areas of the backing in spite of non-uniform color.

CORRECTION OF CONTROL SIGNAL NON-UNIFORMITY

The control signal $E_c$ generated by circuit 18 of FIG. 13a, unless clipped, is proportional to the luminance of the backing. One of the primary functions of the control signal is to control the turn-on of the background scene.

Being proportional to luminance, any non-uniformity of the lighting on the backing becomes a non-uniformity of the background scene video level. Clipping the control signal makes it uniform, but introduces a bright-edge effect on the foreground subject.

Non-uniformity of the control signal can be corrected as follows:

Control signal $E_c$ from logic circuit 18 is connected to memory 123 via switch 122, and is also connected to the Y input of multiplier 126. A momentary closure of switch 122 with the subject removed loads the memory 123 with the control signal $E_c$. The memory therefore contains the control signal representing only the backing. Ideally the control signal should be a constant value over the entire backing. A non-uniformly lighted backing therefore generates a non-uniform control signal.

The output of memory 123 is connected to reciprocal circuit 125 via "OR" gate 124. A second input to the "OR" gate provides a small voltage that prevents the reciprocal circuit from searching for infinity when $E_c$ goes to zero at the end of each scan line.

The output of reciprocal circuit 125 is connected to the X input of multiplier 126. Thus in all areas of the backing not occupied by the subject, the Y input $E_c$ is being multiplied by the X input of multiplier 126 which results in a constant of one. In an opaque subject area, $E_c$ becomes zero and thus the output of multiplier 126 is zero.

The background scene from tape or camera source 128 is connected to the X input of multiplier 127. The output of multiplier 127 is therefore zero in the subject area, and full unity level in all other areas of the backing. Thus the non-uniformities of the backing no longer affect the level of the BG scene video.

The boxed area 121 of FIG. 13a includes the apparatus for correction of control signal non-uniformity.

It should be noted that the output of multiplier 126 is the corrected $Ec$. If section 121 is available, then the corrected $Ec$ from multiplier 126 should replace the uncorrected $Ec$ feeding potentiometer controls 106, 110, and 120.

While the details differ slightly, which details are well within the abilities of one skilled in the art, the color may be encoded with either the NTSC or PAL encoding standard

CHROMA-KEY TYPE SWITCHING SYSTEM

Note that boxed area 112 of FIG. 13a is an apparatus for removing chroma and chroma variations from the colored backing video signal. It is independent of the type of compositing device employed for compositing the FG and BG scenes.

Boxed area 115 is an apparatus for controlling luminance and eliminating luminance variations from the colored backing video signal. It is independent of the type of compositing device employed.

Boxed area 121 is an apparatus for eliminating non-uniformities in the control signal due to non-uniformities in the backing luminance. In non-switching compositing devices the corrected control signal delivered by multiplier 126 controls only the BG scene passing thru multiplier 127. In switching type compositing devices, the output of multiplier 126 controls both the BG multiplier 127 and the FG multiplier 113, causing one to turn on as the other turns off. This is accomplished by connecting the output of multiplier 126 to replace the ground connection at the $-Y$ input of multiplier 113 as shown by line 129 in FIG. 13b which is identical to FIG. 13a except for such connection.

All of the methods described herein remove variations in backing illumination, and will do so whether the video is linear or has been gamma processed. Gamma processing is simply the conversion of the linear video signal to the logarithm of that video signal (not necessarily to base 10).

A shadow is sometimes cast upon the backing. If the backing illumination is non-uniform (e.g., if the backing contains a seam or there is any brightness anomaly in the backing illumination) the correction methods described herein will make a complete luminance correction within the shadow while retaining the shadow, when the video signal is linear.

Some video cameras provide, as outputs, both the linear RGB and the gamma processed RGB. Other cameras provide only the processed (log) RGB video. In this case, if one is to fully compensate for non-uniform illumination in the subject's shadow, it may be necessary to de-process (de-log) the video signal; or, where $E_c$ is placed in memory, to de-log $E_c$.

After correction for backing illumination non-uniformity has been made, the video signals (or $E_c$) must then be re-converted to log form.

The conversion from linear to log, or log to linear is known in the art and appears in most handbooks dealing with linear integrated circuits, for example, *Handbook Of Operational Amplifier Circuit Design*, Stout & Kaufman. McGraw-Hill, copyright 1976. Chapter 17 Logarithmic Circuits.

COMPONENTS

The circuits described herein may be implemented using readily available components as follows:

Memories such as 30, 40, 49, 51, 52, 78 and 90 can be satisfied by such commercial items as a video tape, video disc, solid state (IC) frame store, and the like.

Amplifiers that compare, provide gain, sum and the like including items 1, 38, 42, 43 can be satisfied by an operational amplifier such as the Harris HA-2525.

The sync generator is typically a Tektronix Model SPG 170A NTSC sync generator.

Multipliers, for example, 31, 33, 34, 37, 59, 74, 81, 86 and 93 are typically Motorola MC 1495 or MC 1595 four quadrant multipliers.

Divide circuits, for example, 29, 77, 85, can be satisfied by configuring the Motorola MC 1595 as a divide circuit as noted in the Motorola Linear Circuits Handbook DL 114.

Figure 2:
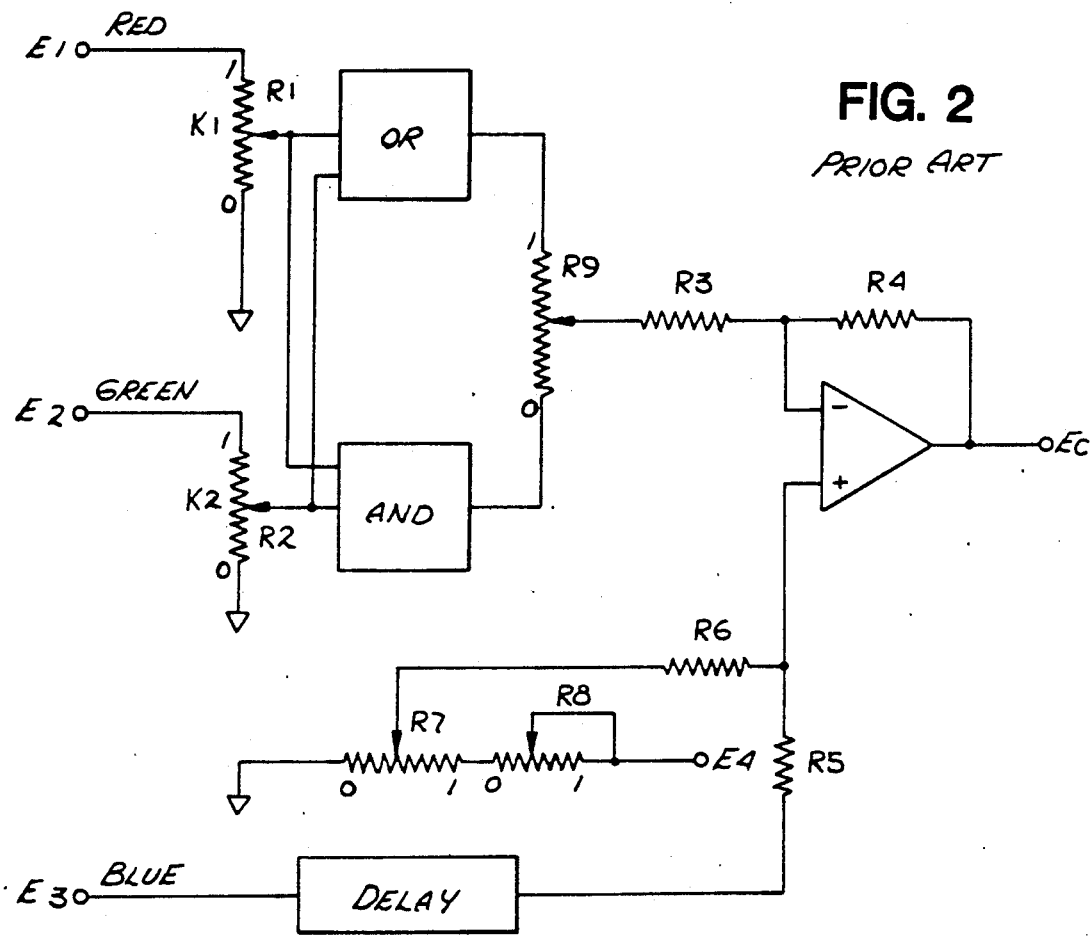
FIG. 2 is a schematic diagram showing a circuit for implementing $E_c$ logic 18.

Clip circuits that provide an upward limit may be satisfied with a linear AND gate. Clip circuits that provide a lower limit may be satisfied with a linear OR gate. Circuit diagrams for both gates are shown by FIG. 2 of applicant's U.S. Pat. No. 4,344,085.

Potentiometer controls such as 2, 21, 25, 36, 41, 47, 65, 68, 73, 80, 88 are commercially available from many manufacturers. Values in the range of 1000 to 5000 ohms are most commonly used.

Switches such as 28, 35, 39, 44, 50, 56, 75 may be panel type toggle switches, push button switches or solid state (IC) switches.

Switches such as 45, 53, 55, should be solid state switches such as the Harris HI 301.

I claim:

1. In a system for generating a foreground video signal, wherein said foreground video signal includes at least a red signal, a blue signal and a green signal, each having an actual color value, said signals generated by scanning a colored backing, and said system includes control logic means for generating a control signal for controlling the compositing of said foreground signal and a background signal, said control signal being formed from said foreground video signal, the improvement comprising:

means for generating for each of said red, blue and green signals, an error correction signal formed by taking the quotient of a predetermined color value and the actual color value.

2. The improvement defined by claim 1 wherein said error correction signal generating means comprises:

second control logic means (72) for generating a second control signal using said foreground signal;

reciprocal means (85) for generating a signal which is a reciprocal of the signal output by said second control logic means;

control signal multiplier means (86) having one input coupled to said control logic means and a second input coupled to said reciprocal means, said control signal multiplier means for generating a signal which is a multiplication of said first and second inputs to said control signal multiplier means;

color video signal correction means (71) coupled to said control signal multiplier means for generating a color video signal representing said backing and a subject for which luminance and color non-uniformities have been corrected.

3. The improvement defined by claim 2 further comprising:

first clip circuit means (84) having an input coupled to said second control logic means and its output coupled to said reciprocal means, said first clip circuit means for outputting the highest of the signal output from said second control logic means and a signal set at a predetermined level.

4. The system defined by claim 2 wherein said color video signal correction means for each of said red, blue and green video signals comprises:

memory means (78) for storing one of said red, green and blue signals for a full frame under control of a switch means (75);

second clip circuit means (73,76) having one input coupled to said memory means, said second clip circuit means for outputting the highest of the signal output from said memory means and a signal set at a predetermined level;

divide circuit means (77) for dividing the output of said clip circuit means by a signal set at a predetermined level (88);

operational amplifier means (83) coupled to said divide circuit means for providing on offset to the output of said divide circuit means;

first multiplier means (81) having a first input coupled to the output of said operational amplifier means, and a second input coupled to said control signal multiplier means, said first multiplier means for generating an output which is a multiplication of said first and second inputs to said first multiplier means;

control means (80) coupled to the outputs of said operational amplifier means and said first multiplier means;

second multiplier means (74) having a first input coupled to a source of said one of said red, blue and green signals, a first Y input coupled to said control means, said control means for controlling the level of the signal supplied to said second input of said second multiplier means, and a second Y input coupled to a predetermined voltage, said second multiplier means for providing a signal which is a multiplication of said first input by the sum of said first Y input and second Y input to said second multiplier means.

5. In an electronic compositing method for compositing a foreground video signal and a background video signal, wherein said foreground video signal includes at least a red signal, a blue signal and a green signal, each having an actual color value, said signals generated by scanning a colored backing said method including the step of generating a control signal using said foreground signal for controlling the compositing of said foreground signal and said background signal, the improvement wherein said scanning comprises the step of:

generating (75-88) for each of said red, blue and green signals, an error correction signal formed by taking the quotient of a predetermined color value and the actual color value.

6. The improvement defined by claim 5 wherein said error correction signal generating step comprises the steps of:

generating (72) a second control signal using said foreground signal, excluding said subject;

generating (85) a signal which is a reciprocal of the second control signal;

generating a signal (86) which is a multiplication of said reciprocal of said second control signal and said control signal;

generating (71) for each of said red, blue and green video signals, a corrected color video signal representing said backing for which luminance and color nonuniformities have been corrected.

7. The improvement defined by claim 6 further comprising the step of generating a signal (84) which is the highest of said second control signal and a reference voltage set at a predetermined level between the steps of generating said second control signal and generating its reciprocal.

8. The improvement defined by claim 6 wherein said step for generating a corrected color video signal for each of said red, blue and green video signals comprises the steps of:

storing in a corresponding memory (78) each of said red, green and blue signals for a full frame under control of a switch (75);

generating a clipped signal (76) which is the highest of the signal output from said memory and a reference voltage set at a predetermined level;

dividing (77) a predetermined reference voltage (88) by the clipped signal (76);

generating an output signal which is a multiplication (81) of the divided clipped signal by said multiplied signal (86);

controlling (80) the divided clipped signal and the output signal to provide a predetermined percentage of each of said divided clipped signal and output signal;

generating a signal which is a multiplication of said one of said one of said red, blue and green signals by said predetermined percentage of each of said divided clipped signal and said output signal.

* * * * *

UNITED STATES PATENT AND TRADEMARK OFFICE
CERTIFICATE OF CORRECTION

PATENT NO. : 5,032,901
DATED : 07/16/91
INVENTOR(S) : Vlahos

It is certified that error appears in the above-identified patent and that said Letters Patent is hereby corrected as shown below:

| | | |
|---|---|---|
| [57] Abstract, line 13 | delete "obtianed" | insert --obtained-- |
| col. 01, line 32 | after "concept" | insert --.-- |
| col. 01, line 63 | delete "source" | insert --sources-- |
| col. 02, line 07 | delete "Ec" | insert --$E_c$-- |
| col. 02, line 54 | delete "soo" | insert --soon-- |
| col. 04, line 55 | delete "RG" | insert --RGB-- |
| col. 04, line 56 | after "subject" | insert --.-- |
| col. 05, line 03 | delete "Ec" | insert --$E_c$-- |
| col. 06, line 38 | delete "tones" | insert --ones-- |
| col. 07, line 59 | delete "since the" | insert --since they-- |
| col. 09, line 51 | delete "sam" | insert --same-- |

UNITED STATES PATENT AND TRADEMARK OFFICE
CERTIFICATE OF CORRECTION

PATENT NO. : 5,032,901
DATED : 07/16/91
INVENTOR(S) : Vlahos

It is certified that error appears in the above-identified patent and that said Letters Patent is hereby corrected as shown below:

| | | |
|---|---|---|
| col. 12, line 04 | delete "Ec" | insert --$E_c$-- |
| col. 12, line 23 | delete "o" | insert --or-- |
| col. 13, line 55 | after "denominator" | insert --,-- |
| col. 14, line 37 | delete "Ec" | insert --$E_c$-- |
| col. 16, line 19 | delete "RG" | insert --RGB-- |
| col. 17, line 42 | delete "ca" | insert --can-- |
| col. 19, line 36 | delete "E$c$" | insert --$E_c$-- |
| col. 19, line 37 | delete "E$c$" | insert --$E_c$-- |
| col. 19, line 38 | delete "E$c$" | insert --$E_c$-- |

Signed and Sealed this

Twentieth Day of April, 1993

*Attest:*

MICHAEL K. KIRK

*Attesting Officer*   *Acting Commissioner of Patents and Trademarks*